(12) United States Patent
Canpolat et al.

(10) Patent No.: US 12,489,587 B2
(45) Date of Patent: Dec. 2, 2025

(54) APPARATUS, SYSTEM, AND METHOD OF COMMUNICATING A QUALITY OF SERVICE (QOS) ELEMENT

(71) Applicant: Intel Corporation, Santa Clara, CA (US)

(72) Inventors: Necati Canpolat, Beaverton, OR (US); Carlos Cordeiro, Portland, OR (US); Laurent Cariou, Milizac (FR); Dave Cavalcanti, Portland, OR (US); Dibakar Das, Hillsboro, OR (US)

(73) Assignee: INTEL CORPORATION, Santa Clara, CA (US)

( * ) Notice: Subject to any disclaimer, the term of this patent is extended or adjusted under 35 U.S.C. 154(b) by 538 days.

(21) Appl. No.: 17/710,850

(22) Filed: Mar. 31, 2022

(65) Prior Publication Data

US 2022/0224495 A1    Jul. 14, 2022

Related U.S. Application Data

(60) Provisional application No. 63/257,466, filed on Oct. 19, 2021.

(51) Int. Cl.
*H04L 5/00* (2006.01)

(52) U.S. Cl.
CPC .......... *H04L 5/0058* (2013.01); *H04L 5/0053* (2013.01)

(58) Field of Classification Search
CPC .... H04L 5/0058; H04L 5/0053; H04W 84/12; H04W 28/24
See application file for complete search history.

(56) References Cited

U.S. PATENT DOCUMENTS

| 12,262,242 | B2 * | 3/2025 | Hu | H04W 28/12 |
| 2012/0191525 | A1 * | 7/2012 | Singh | G06Q 20/405 |
| | | | | 705/14.27 |

OTHER PUBLICATIONS

Search Report for European Patent Application No. 22184955.7, mailed on Dec. 9, 2022, 9 pages.
Ho Duncan et al: "Resolution for CIDs related to TSPEC (CC36)", Sep. 30, 2021 (Sep. 30, 2021), XP093003734, Retrieved from the Internet: URL:https://mentor.ieee.org/802.11/dcn/21/11-21-1407-00-00be-cc36-cr-for-tspec-element.docx [retrieved on Nov. 30, 2022], 9 pages.

(Continued)

*Primary Examiner* — Marisol Figueroa
(74) *Attorney, Agent, or Firm* — Shichrur & Co.

(57) ABSTRACT

For example, an apparatus may be configured to cause an Extremely High Throughput (EHT) wireless communication station (STA) to set a control field including presence signaling information corresponding to a plurality of parameter fields, the presence signaling information configured to indicate, for a parameter field of the plurality of parameter fields, whether the parameter field is to be present or absent in a Quality of Service (QoS) element; and to transmit a frame including the QoS element, the QoS element including the control field, wherein the presence or absence of the plurality of parameter fields in the QoS element is configured according to the presence signaling information in the control field.

21 Claims, 15 Drawing Sheets

(56) References Cited

OTHER PUBLICATIONS

Pascal Viger (Canon): "CR for Low Latency BSR", IEEE Draft; 11-21-1577-00-00BE-CR-for-Low-Latency-BSR, IEEE-SA Mentor, Piscataway, NJ USA, vol. 802.11 EHT; 802.11be, Oct. 14, 2021 (Oct. 14, 2021), pp. 1-12, XP068185432, Retrieved from the Internet: URL: https://mentor.ieee.org/802.11/dcn/21/11-21-1577-00-00be-cr-for-low-latency-bsr.pptx [retrieved on Oct. 14, 2021], 12 pages.

Duncan Ho (Qualcomm): "CC36 Cr for QoS Characteristics element", IEEE Draft; 11-22-0200-00-00BE-CC36-CR-for-QOS-Characteristics-Element, IEEE-SA Mentor, Piscataway, NJ USA, vol. 802.11 EHT; 802.11be, Jan. 25, 2022 (Jan. 25, 2022), pp. 1-8, XP068188682, Retrieved from the Internet: URL: https://mentor.ieee.org/802.11/dcn/22/11-22-0200-00-00be-cc36-cr-for-qos-characteristics-element.docx [retrieved on Jan. 25, 2022], 8 pages.

Dave Cavalcanti (Intel Corporation): "Enhancements for QoS and low latency in 802.11be R1", IEEE Draft; 11-20-1350-06-00BE-Enhancements-for-QOS-and-Low-Latency-in-802-11BE-R1, IEEE-SA Mentor, Piscataway, NJ USA, vol. 802.11 EHT; 802.11be, No. 6, Jan. 7, 2021 (Jan. 7, 2021), pp. 1-14, XP068175649, Retrieved from the Internet: URL: https://mentor.ieee.org/802.11/dcn/20/11-20-1350-06-00be-enhancements-for-qos-and-low-latency-in-802-11be-r1.pptx [retrieved on Jan. 7, 2021], 14 pages.

IEEE Standard for Information Technology—Telecommunications and Information Exchange between Systems Local and Metropolitan Area Networks—Specific Requirements, Part 11: Wireless LAN Medium Access Control (MAC) and Physical Layer (PHY) Specifications, IEEE Computer Society, IEEE Std 802.11™-2020 (Revision of IEEE Std 802.11-2016), Approved Dec. 3, 2020, 4379 pages.

Office Action for European Patent Application No. 22184955.7, mailed on Oct. 16, 2025, 10 pages.

Jarkko Kneckt (Nokia): "CC08—resolutions to cids 1142, 1446 and 1220", IEEE Draft; 11-13-0585-00-00AI-CC08-RESOLUTIONS-TOCIDS-1142-1446-AND-1220, IEEE-SA Mentor, Piscataway, NJ USA, vol. 802.11ai May 15, 2013 (May 15, 2013), pp. 1-5, XP068118934, Retrieved from the Internet: URL: https://mentor.IEEE.org/802.11/dcn/13/11-13-0585-00-00ai-cc08-resolutions-to-cids-1142-1446-and-1220.docx, [retrieved on May 15, 2013].

* cited by examiner

APPARATUS, SYSTEM, AND METHOD OF COMMUNICATING A QUALITY OF SERVICE (QOS) ELEMENT

CROSS REFERENCE

This application claims the benefit of and priority from U.S. Provisional Patent Application No. 63/257,466 entitled "MECHANISM TO SIGNAL QOS PARAMETERS USING SCS PROCEDURE", filed Oct. 19, 2021, the entire disclosure of which is incorporated herein by reference.

TECHNICAL FIELD

Aspects described herein generally relate communicating a Quality of Service (QoS) element.

BACKGROUND

Devices in a wireless communication system may be configured to communicate according to communication protocols, which may be configured to support high-throughput data for users of wireless communication devices.

BRIEF DESCRIPTION OF THE DRAWINGS

For simplicity and clarity of illustration, elements shown in the figures have not necessarily been drawn to scale. For example, the dimensions of some of the elements may be exaggerated relative to other elements for clarity of presentation. Furthermore, reference numerals may be repeated among the figures to indicate corresponding or analogous elements. The figures are listed below.

DETAILED DESCRIPTION

Figure 1:
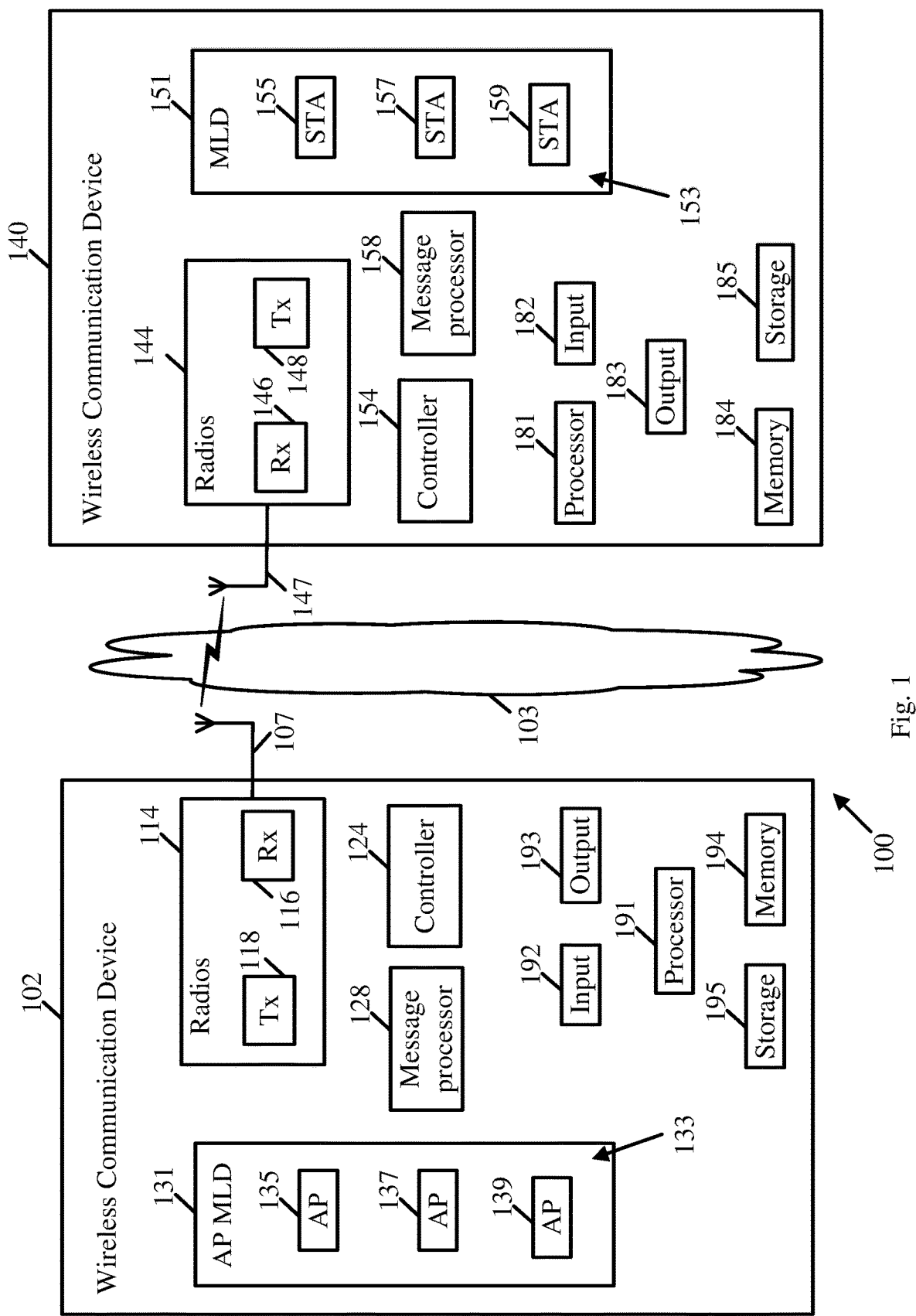
FIG. 1 is a schematic block diagram illustration of a system, in accordance with some demonstrative aspects.

In the following detailed description, numerous specific details are set forth in order to provide a thorough understanding of some aspects. However, it will be understood by persons of ordinary skill in the art that some aspects may be practiced without these specific details. In other instances, well-known methods, procedures, components, units and/or circuits have not been described in detail so as not to obscure the discussion.

Discussions herein utilizing terms such as, for example, "processing", "computing", "calculating", "determining", "establishing", "analyzing", "checking", or the like, may refer to operation(s) and/or process(es) of a computer, a computing platform, a computing system, or other electronic computing device, that manipulate and/or transform data represented as physical (e.g., electronic) quantities within the computer's registers and/or memories into other data similarly represented as physical quantities within the computer's registers and/or memories or other information storage medium that may store instructions to perform operations and/or processes.

The terms "plurality" and "a plurality", as used herein, include, for example, "multiple" or "two or more". For example, "a plurality of items" includes two or more items.

References to "one aspect", "an aspect", "demonstrative aspect", "various aspects" etc., indicate that the aspect(s) so described may include a particular feature, structure, or characteristic, but not every aspect necessarily includes the particular feature, structure, or characteristic. Further, repeated use of the phrase "in one aspect" does not necessarily refer to the same aspect, although it may.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

Some aspects may be used in conjunction with various devices and systems, for example, a User Equipment (UE), a Mobile Device (MD), a wireless station (STA), a Personal Computer (PC), a desktop computer, a mobile computer, a laptop computer, a notebook computer, a tablet computer, a server computer, a handheld computer, a handheld device, a wearable device, a sensor device, an Internet of Things (IoT) device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some aspects may be used in conjunction with devices and/or networks operating in accordance with existing IEEE 802.11 standards (including IEEE 802.11-2020 (*IEEE 802.11-2020, IEEE Standard for Information Technology—Telecommunications and Information Exchange between Systems Local and Metropolitan Area Networks—Specific Requirements; Part 11: Wireless LAN Medium Access Control (MAC) and Physical Layer (PHY) Specifications, December,* 2020); and/or IEEE 802.11be (IEEE *P802.11be/D1.4. Draft Standard for Information technology—Telecommunications and information exchange between systems Local and metropolitan area networks—Specific requirements; Part 11: Wireless LAN Medium Access Control (MAC) and Physical Layer (PHY) Specifications; Amendment 8: Enhancements for extremely high throughput (EHT), January* 2022)) and/or future versions and/or derivatives thereof, devices and/or networks operating in accordance with existing cellular specifications and/or protocols, e.g., 3rd Generation Partnership Project (3GPP), 3GPP Long Term Evolution (LTE) and/or future versions and/or derivatives thereof, units and/or devices which are part of the above networks, and the like.

Some aspects may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some aspects may be used in conjunction with one or more types of wireless communication signals and/or systems, for example, Radio Frequency (RF), Infra-Red (IR), Frequency-Division Multiplexing (FDM), Orthogonal FDM (OFDM), Orthogonal Frequency-Division Multiple Access (OFDMA), FDM Time-Division Multiplexing (TDM), Time-Division Multiple Access (TDMA), Multi-User MIMO (MU-MIMO), Spatial Division Multiple Access (SDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth®, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G), or Sixth Generation (6G) mobile networks, 3GPP, Long Term Evolution (LTE), LTE advanced, Enhanced Data rates for GSM Evolution (EDGE), or the like. Other aspects may be used in various other devices, systems and/or networks.

The term "wireless device", as used herein, includes, for example, a device capable of wireless communication, a communication device capable of wireless communication, a communication station capable of wireless communication, a portable or non-portable device capable of wireless communication, or the like. In some demonstrative aspects, a wireless device may be or may include a peripheral that may be integrated with a computer, or a peripheral that may be attached to a computer. In some demonstrative aspects, the term "wireless device" may optionally include a wireless service.

The term "communicating" as used herein with respect to a communication signal includes transmitting the communication signal and/or receiving the communication signal. For example, a communication unit, which is capable of communicating a communication signal, may include a transmitter to transmit the communication signal to at least one other communication unit, and/or a communication receiver to receive the communication signal from at least one other communication unit. The verb communicating may be used to refer to the action of transmitting or the action of receiving. In one example, the phrase "communicating a signal" may refer to the action of transmitting the signal by a first device, and may not necessarily include the action of receiving the signal by a second device. In another example, the phrase "communicating a signal" may refer to the action of receiving the signal by a first device, and may not necessarily include the action of transmitting the signal by a second device. The communication signal may be transmitted and/or received, for example, in the form of Radio Frequency (RF) communication signals, and/or any other type of signal.

As used herein, the term "circuitry" may refer to, be part of, or include, an Application Specific Integrated Circuit (ASIC), an integrated circuit, an electronic circuit, a processor (shared, dedicated or group), and/or memory (shared. Dedicated, or group), that execute one or more software or firmware programs, a combinational logic circuit, and/or other suitable hardware components that provide the described functionality. In some aspects, the circuitry may be implemented in, or functions associated with the circuitry may be implemented by, one or more software or firmware modules. In some aspects, circuitry may include logic, at least partially operable in hardware.

The term "logic" may refer, for example, to computing logic embedded in circuitry of a computing apparatus and/or computing logic stored in a memory of a computing apparatus. For example, the logic may be accessible by a processor of the computing apparatus to execute the computing logic to perform computing functions and/or operations. In one example, logic may be embedded in various types of memory and/or firmware, e.g., silicon blocks of various chips and/or processors. Logic may be included in, and/or implemented as part of, various circuitry, e.g. radio circuitry, receiver circuitry, control circuitry, transmitter circuitry, transceiver circuitry, processor circuitry, and/or the like. In one example, logic may be embedded in volatile memory and/or non-volatile memory, including random access memory, read only memory, programmable memory, magnetic memory, flash memory, persistent memory, and the like. Logic may be executed by one or more processors using memory, e.g., registers, stuck, buffers, and/or the like, coupled to the one or more processors, e.g., as necessary to execute the logic.

Some demonstrative aspects may be used in conjunction with a WLAN, e.g., a WiFi network. Other aspects may be used in conjunction with any other suitable wireless communication network, for example, a wireless area network, a "piconet", a WPAN, a WVAN and the like.

Some demonstrative aspects may be used in conjunction with a wireless communication network communicating over a sub-10 Gigahertz (GHz) frequency band, for example, a 2.4 GHz frequency band, a 5 GHz frequency band, a 6 GHz frequency band, and/or any other frequency band below 10 GHz.

Some demonstrative aspects may be used in conjunction with a wireless communication network communicating over an Extremely High Frequency (EHF) band (also referred to as the "millimeter wave (mmWave)" frequency band), for example, a frequency band within the frequency band of between 20 Ghz and 300 GHz, for example, a frequency band above 45 GHz, e.g., a 60 GHz frequency band, and/or any other mmWave frequency band.

Some demonstrative aspects may be used in conjunction with a wireless communication network communicating over the sub-10 GHz frequency band and/or the mmWave frequency band, e.g., as described below. However, other aspects may be implemented utilizing any other suitable wireless communication frequency bands, for example, a 5G frequency band, a frequency band below 20 GHz, a Sub 1 GHz (S1G) band, a WLAN frequency band, a WPAN frequency band, and the like.

The term "antenna", as used herein, may include any suitable configuration, structure and/or arrangement of one or more antenna elements, components, units, assemblies and/or arrays. In some aspects, the antenna may implement transmit and receive functionalities using separate transmit and receive antenna elements. In some aspects, the antenna may implement transmit and receive functionalities using common and/or integrated transmit/receive elements. The antenna may include, for example, a phased array antenna, a single element antenna, a set of switched beam antennas, and/or the like.

Reference is made to FIG. 1, which schematically illustrates a system 100, in accordance with some demonstrative aspects.

As shown in FIG. 1, in some demonstrative aspects, system 100 may include one or more wireless communication devices. For example, system 100 may include a wireless communication device 102, a wireless communication device 140, and/or one or more other devices.

In some demonstrative aspects, devices 102 and/or 140 may include a mobile device or a non-mobile, e.g., a static, device.

For example, devices 102 and/or 140 may include, for example, a UE, an MD, a STA, an AP, a PC, a desktop computer, a mobile computer, a laptop computer, an Ultrabook™ computer, a notebook computer, a tablet computer, a server computer, a handheld computer, an Internet of Things (IoT) device, a sensor device, a handheld device, a wearable device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "Carry Small Live Large" (CSLL) device, an Ultra Mobile Device (UMD), an Ultra Mobile PC (UMPC), a Mobile Internet Device (MID), an "Origami" device or computing device, a device that supports Dynamically Composable Computing (DCC), a context-aware device, a video device, an audio device, an A/V device, a Set-Top-Box (STB), a Blu-ray disc (BD) player, a BD recorder, a Digital Video Disc (DVD) player, a High Definition (HD) DVD player, a DVD recorder, a HD DVD recorder, a Personal Video Recorder (PVR), a broadcast HD receiver, a video source, an audio source, a video sink, an audio sink, a stereo tuner, a broadcast radio receiver, a flat panel display, a Personal Media Player (PMP), a digital video camera (DVC), a digital audio player, a speaker, an audio receiver, an audio amplifier, a gaming device, a data source, a data sink, a Digital Still camera (DSC), a media player, a Smartphone, a television, a music player, or the like.

In some demonstrative aspects, device 102 may include, for example, one or more of a processor 191, an input unit 192, an output unit 193, a memory unit 194, and/or a storage unit 195; and/or device 140 may include, for example, one or more of a processor 181, an input unit 182, an output unit 183, a memory unit 184, and/or a storage unit 185. Devices 102 and/or 140 may optionally include other suitable hardware components and/or software components. In some demonstrative aspects, some or all of the components of one or more of devices 102 and/or 140 may be enclosed in a common housing or packaging, and may be interconnected or operably associated using one or more wired or wireless links. In other aspects, components of one or more of devices 102 and/or 140 may be distributed among multiple or separate devices.

In some demonstrative aspects, processor 191 and/or processor 181 may include, for example, a Central Processing Unit (CPU), a Digital Signal Processor (DSP), one or more processor cores, a single-core processor, a dual-core processor, a multiple-core processor, a microprocessor, a host processor, a controller, a plurality of processors or controllers, a chip, a microchip, one or more circuits, circuitry, a logic unit, an Integrated Circuit (IC), an Application-Specific IC (ASIC), or any other suitable multi-purpose or specific processor or controller. Processor 191 may execute instructions, for example, of an Operating System (OS) of device 102 and/or of one or more suitable applications. Processor 181 may execute instructions, for example, of an Operating System (OS) of device 140 and/or of one or more suitable applications.

In some demonstrative aspects, input unit 192 and/or input unit 182 may include, for example, a keyboard, a keypad, a mouse, a touch-screen, a touch-pad, a track-ball, a stylus, a microphone, or other suitable pointing device or input device. Output unit 193 and/or output unit 183 may include, for example, a monitor, a screen, a touch-screen, a flat panel display, a Light Emitting Diode (LED) display unit, a Liquid Crystal Display (LCD) display unit, a plasma display unit, one or more audio speakers or earphones, or other suitable output devices.

In some demonstrative aspects, memory unit 194 and/or memory unit 184 includes, for example, a Random Access Memory (RAM), a Read Only Memory (ROM), a Dynamic RAM (DRAM), a Synchronous DRAM (SD-RAM), a flash memory, a volatile memory, a non-volatile memory, a cache memory, a buffer, a short term memory unit, a long term memory unit, or other suitable memory units. Storage unit 195 and/or storage unit 185 may include, for example, a hard disk drive, a floppy disk drive, a Compact Disk (CD) drive, a CD-ROM drive, a DVD drive, or other suitable removable or non-removable storage units. Memory unit 194 and/or storage unit 195, for example, may store data processed by device 102. Memory unit 184 and/or storage unit 185, for example, may store data processed by device 140.

In some demonstrative aspects, wireless communication devices 102 and/or 140 may be capable of communicating content, data, information and/or signals via a wireless medium (WM) 103. In some demonstrative aspects, wireless medium 103 may include, for example, a radio channel, an RF channel, a WiFi channel, a cellular channel, a 5G channel, an IR channel, a Bluetooth (BT) channel, a Global Navigation Satellite System (GNSS) Channel, and the like.

In some demonstrative aspects, WM 103 may include one or more wireless communication frequency bands and/or channels. For example, WM 103 may include one or more channels in a sub-10 Ghz wireless communication frequency band, for example, a 2.4 GHz wireless communication frequency band, one or more channels in a 5 GHz wireless communication frequency band, and/or one or more channels in a 6 GHz wireless communication frequency band. In another example, WM 103 may additionally or alternative include one or more channels in a mmWave wireless communication frequency band.

In other aspects, WM 103 may include any other type of channel over any other frequency band.

In some demonstrative aspects, device 102 and/or device 140 may include one or more radios including circuitry and/or logic to perform wireless communication between devices 102, 140 and/or one or more other wireless communication devices. For example, device 102 may include one or more radios 114, and/or device 140 may include one or more radios 144.

In some demonstrative aspects, radios 114 and/or 144 may include one or more wireless receivers (Rx) including circuitry and/or logic to receive wireless communication signals, RF signals, frames, blocks, transmission streams, packets, messages, data items, and/or data. For example, a radio 114 may include at least one receiver 116, and/or a radio 144 may include at least one receiver 146.

In some demonstrative aspects, radios 114 and/or 144 may include one or more wireless transmitters (Tx) including circuitry and/or logic to transmit wireless communication signals, RF signals, frames, blocks, transmission streams, packets, messages, data items, and/or data. For example, a radio 114 may include at least one transmitter 118, and/or a radio 144 may include at least one transmitter 148.

In some demonstrative aspects, radios 114 and/or 144, transmitters 118 and/or 148, and/or receivers 116 and/or 146 may include circuitry; logic; Radio Frequency (RF) elements, circuitry and/or logic; baseband elements, circuitry and/or logic; modulation elements, circuitry and/or logic; demodulation elements, circuitry and/or logic; amplifiers; analog to digital and/or digital to analog converters; filters; and/or the like. For example, radios 114 and/or 144 may include or may be implemented as part of a wireless Network Interface Card (NIC), and the like.

In some demonstrative aspects, radios 114 and/or 144 may be configured to communicate over a 2.4 GHz band, a 5 GHz band, a 6 GHz band, and/or any other band, for example, a directional band, e.g., an mmWave band, a 5G band, an S1G band, and/or any other band.

In some demonstrative aspects, radios 114 and/or 144 may include, or may be associated with one or more, e.g., a plurality of, antennas.

In some demonstrative aspects, device 102 may include one or more, e.g., a plurality of, antennas 107, and/or device 140 may include on or more, e.g., a plurality of, antennas 147.

Antennas 107 and/or 147 may include any type of antennas suitable for transmitting and/or receiving wireless communication signals, blocks, frames, transmission streams, packets, messages and/or data. For example, antennas 107 and/or 147 may include any suitable configuration, structure and/or arrangement of one or more antenna elements, components, units, assemblies and/or arrays. In some aspects, antennas 107 and/or 147 may implement transmit and receive functionalities using separate transmit and receive antenna elements. In some aspects, antennas 107 and/or 147 may implement transmit and receive functionalities using common and/or integrated transmit/receive elements.

In some demonstrative aspects, device 102 may include a controller 124, and/or device 140 may include a controller 154. Controller 124 may be configured to perform and/or to trigger, cause, instruct and/or control device 102 to perform, one or more communications, to generate and/or communicate one or more messages and/or transmissions, and/or to perform one or more functionalities, operations and/or procedures between devices 102, 140 and/or one or more other devices; and/or controller 154 may be configured to perform, and/or to trigger, cause, instruct and/or control device 140 to perform, one or more communications, to generate and/or communicate one or more messages and/or transmissions, and/or to perform one or more functionalities, operations and/or procedures between devices 102, 140 and/or one or more other devices, e.g., as described below.

In some demonstrative aspects, controllers 124 and/or 154 may include, or may be implemented, partially or entirely, by circuitry and/or logic, e.g., one or more processors including circuitry and/or logic, memory circuitry and/or logic, Media-Access Control (MAC) circuitry and/or logic, Physical Layer (PHY) circuitry and/or logic, baseband (BB) circuitry and/or logic, a BB processor, a BB memory, Application Processor (AP) circuitry and/or logic, an AP processor, an AP memory, and/or any other circuitry and/or logic, configured to perform the functionality of controllers 124 and/or 154, respectively. Additionally or alternatively, one or more functionalities of controllers 124 and/or 154 may be implemented by logic, which may be executed by a machine and/or one or more processors, e.g., as described below.

In one example, controller 124 may include circuitry and/or logic, for example, one or more processors including circuitry and/or logic, to cause, trigger and/or control a wireless device, e.g., device 102, and/or a wireless station, e.g., a wireless STA implemented by device 102, to perform one or more operations, communications and/or functionalities, e.g., as described herein. In one example, controller 124 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In one example, controller 154 may include circuitry and/or logic, for example, one or more processors including circuitry and/or logic, to cause, trigger and/or control a wireless device, e.g., device 140, and/or a wireless station, e.g., a wireless STA implemented by device 140, to perform one or more operations, communications and/or functionalities, e.g., as described herein. In one example, controller 154 may include at least one memory, e.g., coupled to the one or more processors, which may be configured, for example, to store, e.g., at least temporarily, at least some of the information processed by the one or more processors and/or circuitry, and/or which may be configured to store logic to be utilized by the processors and/or circuitry.

In some demonstrative aspects, at least part of the functionality of controller 124 may be implemented as part of one or more elements of radio 114, and/or at least part of the functionality of controller 154 may be implemented as part of one or more elements of radio 144.

In other aspects, the functionality of controller 124 may be implemented as part of any other element of device 102, and/or the functionality of controller 154 may be implemented as part of any other element of device 140.

In some demonstrative aspects, device 102 may include a message processor 128 configured to generate, process and/or access one or more messages communicated by device 102.

In one example, message processor 128 may be configured to generate one or more messages to be transmitted by device 102, and/or message processor 128 may be configured to access and/or to process one or more messages received by device 102, e.g., as described below.

In one example, message processor 128 may include at least one first component configured to generate a message, for example, in the form of a frame, field, information element and/or protocol data unit, for example, a MAC Protocol Data Unit (MPDU); at least one second component configured to convert the message into a PHY Protocol Data Unit (PPDU), for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 128 may be configured to perform any other additional or alternative functionality and/or may include any other additional or alternative components to generate and/or process a message to be transmitted.

In some demonstrative aspects, device 140 may include a message processor 158 configured to generate, process and/or access one or more messages communicated by device 140.

In one example, message processor 158 may be configured to generate one or more messages to be transmitted by device 140, and/or message processor 158 may be configured to access and/or to process one or more messages received by device 140, e.g., as described below.

In one example, message processor 158 may include at least one first component configured to generate a message, for example, in the form of a frame, field, information element and/or protocol data unit, for example, an MPDU; at least one second component configured to convert the message into a PPDU, for example, by processing the message generated by the at least one first component, e.g., by encoding the message, modulating the message and/or performing any other additional or alternative processing of the message; and/or at least one third component configured to cause transmission of the message over a wireless communication medium, e.g., over a wireless communication channel in a wireless communication frequency band, for example, by applying to one or more fields of the PPDU one or more transmit waveforms. In other aspects, message processor 158 may be configured to perform any other additional or alternative functionality and/or may include any other additional or alternative components to generate and/or process a message to be transmitted.

In some demonstrative aspects, message processors 128 and/or 158 may include, or may be implemented, partially or entirely, by circuitry and/or logic, e.g., one or more processors including circuitry and/or logic, memory circuitry and/or logic, MAC circuitry and/or logic, PHY circuitry and/or logic, BB circuitry and/or logic, a BB processor, a BB memory, AP circuitry and/or logic, an AP processor, an AP memory, and/or any other circuitry and/or logic, configured to perform the functionality of message processors 128 and/or 158, respectively. Additionally or alternatively, one or more functionalities of message processors 128 and/or 158 may be implemented by logic, which may be executed by a machine and/or one or more processors, e.g., as described below.

In some demonstrative aspects, at least part of the functionality of message processor 128 may be implemented as part of radio 114, and/or at least part of the functionality of message processor 158 may be implemented as part of radio 144.

In some demonstrative aspects, at least part of the functionality of message processor 128 may be implemented as part of controller 124, and/or at least part of the functionality of message processor 158 may be implemented as part of controller 154.

In other aspects, the functionality of message processor 128 may be implemented as part of any other element of device 102, and/or the functionality of message processor 158 may be implemented as part of any other element of device 140.

In some demonstrative aspects, at least part of the functionality of controller 124 and/or message processor 128 may be implemented by an integrated circuit, for example, a chip, e.g., a System on Chip (SoC). In one example, the chip or SoC may be configured to perform one or more functionalities of one or more radios 114. For example, the chip or SoC may include one or more elements of controller 124, one or more elements of message processor 128, and/or one or more elements of one or more radios 114. In one example, controller 124, message processor 128, and one or more radios 114 may be implemented as part of the chip or SoC.

In other aspects, controller 124, message processor 128 and/or the one or more radios 114 may be implemented by one or more additional or alternative elements of device 102.

In some demonstrative aspects, at least part of the functionality of controller 154 and/or message processor 158 may be implemented by an integrated circuit, for example, a chip, e.g., a SoC. In one example, the chip or SoC may be configured to perform one or more functionalities of one or more radios 144. For example, the chip or SoC may include one or more elements of controller 154, one or more elements of message processor 158, and/or one or more elements of one or more radios 144. In one example, controller 154, message processor 158, and one or more radios 144 may be implemented as part of the chip or SoC.

In other aspects, controller 154, message processor 158 and/or one or more radios 144 may be implemented by one or more additional or alternative elements of device 140.

In some demonstrative aspects, device 102 and/or device 140 may include, operate as, perform the role of, and/or perform one or more functionalities of, one or more STAs. For example, device 102 may include at least one STA, and/or device 140 may include at least one STA.

In some demonstrative aspects, device 102 and/or device 140 may include, operate as, perform the role of, and/or perform one or more functionalities of, one or more Extremely High Throughput (EHT) STAs. For example, device 102 may include, operate as, perform the role of, and/or perform one or more functionalities of, one or more EHT STAs, and/or device 140 may include, operate as, perform the role of, and/or perform one or more functionalities of, one or more EHT STAs.

In other aspects, devices 102 and/or 140 may include, operate as, perform the role of, and/or perform one or more functionalities of, any other wireless device and/or station, e.g., a WLAN STA, a WiFi STA, and the like.

In some demonstrative aspects, device 102 and/or device 140 may be configured operate as, perform the role of, and/or perform one or more functionalities of, an access point (AP), e.g., an EHT AP STA.

In some demonstrative aspects, device 102 and/or device 140 may be configured to operate as, perform the role of, and/or perform one or more functionalities of, a non-AP STA, e.g., an EHT non-AP STA.

In other aspects, device 102 and/or device 140 may operate as, perform the role of, and/or perform one or more functionalities of, any other additional or alternative device and/or station.

In one example, a station (STA) may include a logical entity that is a singly addressable instance of a medium access control (MAC) and physical layer (PHY) interface to the wireless medium (WM). The STA may perform any other additional or alternative functionality.

In one example, an AP may include an entity that contains one station (STA) and provides access to the distribution services, via the wireless medium (WM) for associated STAs. An AP may include a STA and a distribution system access function (DSAF). The AP may perform any other additional or alternative functionality.

In some demonstrative aspects devices 102 and/or 140 may be configured to communicate in an EHT network, and/or any other network.

In some demonstrative aspects, devices 102 and/or 140 may be configured to operate in accordance with one or more Specifications, for example, including one or more *IEEE 802.11 Specifications*, e.g., an *IEEE 802.11-2020 Specification*, an *IEEE 802.11be Specification*, and/or any other specification and/or protocol.

In some demonstrative aspects, device 102 and/or device 140 may include, operate as, perform a role of, and/or perform the functionality of, one or more multi-link logical entities, e.g., as described below.

In other aspect, device 102 and/or device 140 may include, operate as, perform a role of, and/or perform the functionality of, any other entities, e.g., which are not multi-link logical entities.

For example, a multi-link logical entity may include a logical entity that contains one or more STAs. The logical entity may have one MAC data service interface and primitives to the logical link control (LLC) and a single address associated with the interface, which can be used to communicate on a distribution system medium (DSM). For example, the DSM may include a medium or set of media used by a distribution system (DS) for communications between APs, mesh gates, and the portal of an extended service set (ESS). For example, the DS may include a system used to interconnect a set of basic service sets (BSSs) and integrated local area networks (LANs) to create an extended service set (ESS). In one example, a multi-link logical entity may allow STAs within the multi-link logical entity to have the same MAC address. The multi-link entity may perform any other additional or alternative functionality.

In some demonstrative aspects, device 102 and/or device 140 may include, operate as, perform a role of, and/or perform the functionality of, a Multi-Link Device (MLD). For example, device 102 may include, operate as, perform a role of, and/or perform the functionality of, at least one MLD, and/or device 140 may include, operate as, perform a role of, and/or perform the functionality of, at least one MLD, e.g., as described below.

For example, an MLD may include a device that is a logical entity and has more than one affiliated STA and has a single MAC service access point (SAP) to LLC, which includes one MAC data service. The MLD may perform any other additional or alternative functionality.

In some demonstrative aspects, for example, an infrastructure framework may include a multi-link AP logical entity, which includes APs, e.g., on one side, and a multi-link non-AP logical entity, which includes non-APs, e.g., on the other side.

In some demonstrative aspects, device 102 and/or device 140 may be configured to operate as, perform the role of, and/or perform one or more functionalities of, an AP MLD.

In some demonstrative aspects, device 102 and/or device 140 may be configured to operate as, perform the role of, and/or perform one or more functionalities of, a non-AP MLD.

In other aspects, device 102 and/or device 140 may operate as, perform the role of, and/or perform one or more functionalities of, any other additional or alternative device and/or station.

For example, an AP MLD may include an MLD, where each STA affiliated with the MLD is an AP. In one example, the AP MLD may include a multi-link logical entity, where each STA within the multi-link logical entity is an EHT AP. The AP MLD may perform any other additional or alternative functionality.

For example, a non-AP MLD may include an MLD, where each STA affiliated with the MLD is a non-AP STA. In one example, the non-AP MLD may include a multi-link logical entity, where each STA within the multi-link logical entity is a non-AP EHT STA. The non-AP MLD may perform any other additional or alternative functionality.

In one example, a multi-link infrastructure framework may be configured as an extension from a one link operation between two STAs, e.g., an AP and a non-AP STA.

In some demonstrative aspects, controller 124 may be configured to cause, trigger, instruct and/or control device 102 to operate as, perform a role of, and/or perform one or more operations and/or functionalities of, an AP MLD 131 including a plurality of AP STAs 133, e.g., including an AP STA 135, an AP STA 137 and/or an AP STA 139. In some aspects, as shown in FIG. 1, AP MLD 131 may include three AP STAs. In other aspects, AP MLD 131 may include any other number of AP STAs.

In one example, AP STA 135, AP STA 137 and/or AP STA 139 may operate as, perform a role of, and/or perform one or more operations and/or functionalities of, an EHT AP STA. In other aspects, AP STA 135, AP STA 137 and/or AP STA 139 may perform any other additional or alternative functionality.

In some demonstrative aspects, for example, the one or more radios 114 may include, for example, a radio for communication by AP STA 135 over a first wireless communication frequency channel and/or frequency band, e.g., a 2.4 Ghz band, as described below.

In some demonstrative aspects, for example, the one or more radios 114 may include, for example, a radio for communication by AP STA 137 over a second wireless communication frequency channel and/or frequency band, e.g., a 5 Ghz band, as described below.

In some demonstrative aspects, for example, the one or more radios 114 may include, for example, a radio for communication by AP STA 139 over a third wireless communication frequency channel and/or frequency band, e.g., a 6 Ghz band, as described below.

In some demonstrative aspects, the radios 114 utilized by APs 133 may be implemented as separate radios. In other aspects, the radios 114 utilized by APs 133 may be implemented by one or more shared and/or common radios and/or radio components.

In other aspects controller 124 may be configured to cause, trigger, instruct and/or control device 102 to operate as, perform a role of, and/or perform one or more operations and/or functionalities of, any other additional or alternative entity and/or STA, e.g., a single STA, multiple STAs, and/or a non-MLD entity.

In some demonstrative aspects, controller 154 may be configured to cause, trigger, instruct and/or control device 140 to operate as, perform a role of, and/or perform one or more operations and/or functionalities of, an MLD 151 including a plurality of STAs 153, e.g., including a STA 155, a STA 157 and/or a STA 159. In some aspects, as shown in FIG. 1, MLD 151 may include three STAs. In other aspects, MLD 151 may include any other number of STAs.

In one example, STA 155, STA 157 and/or STA 159 may operate as, perform a role of, and/or perform one or more operations and/or functionalities of, an EHT STA. In other aspects, STA 155, STA 157 and/or STA 159 may perform any other additional or alternative functionality.

In some demonstrative aspects, for example, the one or more radios 144 may include, for example, a radio for communication by STA 155 over a first wireless communication frequency channel and/or frequency band, e.g., a 2.4 Ghz band, as described below.

In some demonstrative aspects, for example, the one or more radios 144 may include, for example, a radio for communication by STA 157 over a second wireless communication frequency channel and/or frequency band, e.g., a 5 Ghz band, as described below.

In some demonstrative aspects, for example, the one or more radios 144 may include, for example, a radio for communication by STA 159 over a third wireless communication frequency channel and/or frequency band, e.g., a 6 Ghz band, as described below.

In some demonstrative aspects, the radios 144 utilized by STAs 153 may be implemented as separate radios. In other aspects, the radios 144 utilized by STAs 153 may be implemented by one or more shared and/or common radios and/or radio components.

In some demonstrative aspects, controller 154 may be configured to cause, trigger, instruct and/or control MLD 151 to operate as, perform a role of, and/or perform one or more operations and/or functionalities of, a non-AP MLD. For example, STA 155, STA 157 and/or STA 159 may operate as, perform a role of, and/or perform one or more operations and/or functionalities of, a non-AP EHT STA.

In some demonstrative aspects, controller 154 may be configured to cause, trigger, instruct and/or control MLD 151 to operate as, perform a role of, and/or perform one or more operations and/or functionalities of, an AP MLD. For example, STA 155, STA 157 and/or STA 159 may operate as, perform a role of, and/or perform one or more operations and/or functionalities of, an AP EHT STA.

In other aspects controller 154 may be configured to cause, trigger, instruct and/or control device 140 to operate as, perform a role of, and/or perform one or more operations and/or functionalities of, any other additional or alternative entity and/or STA, e.g., a single STA, multiple STAs, and/or a non-MLD entity.

Figure 2:
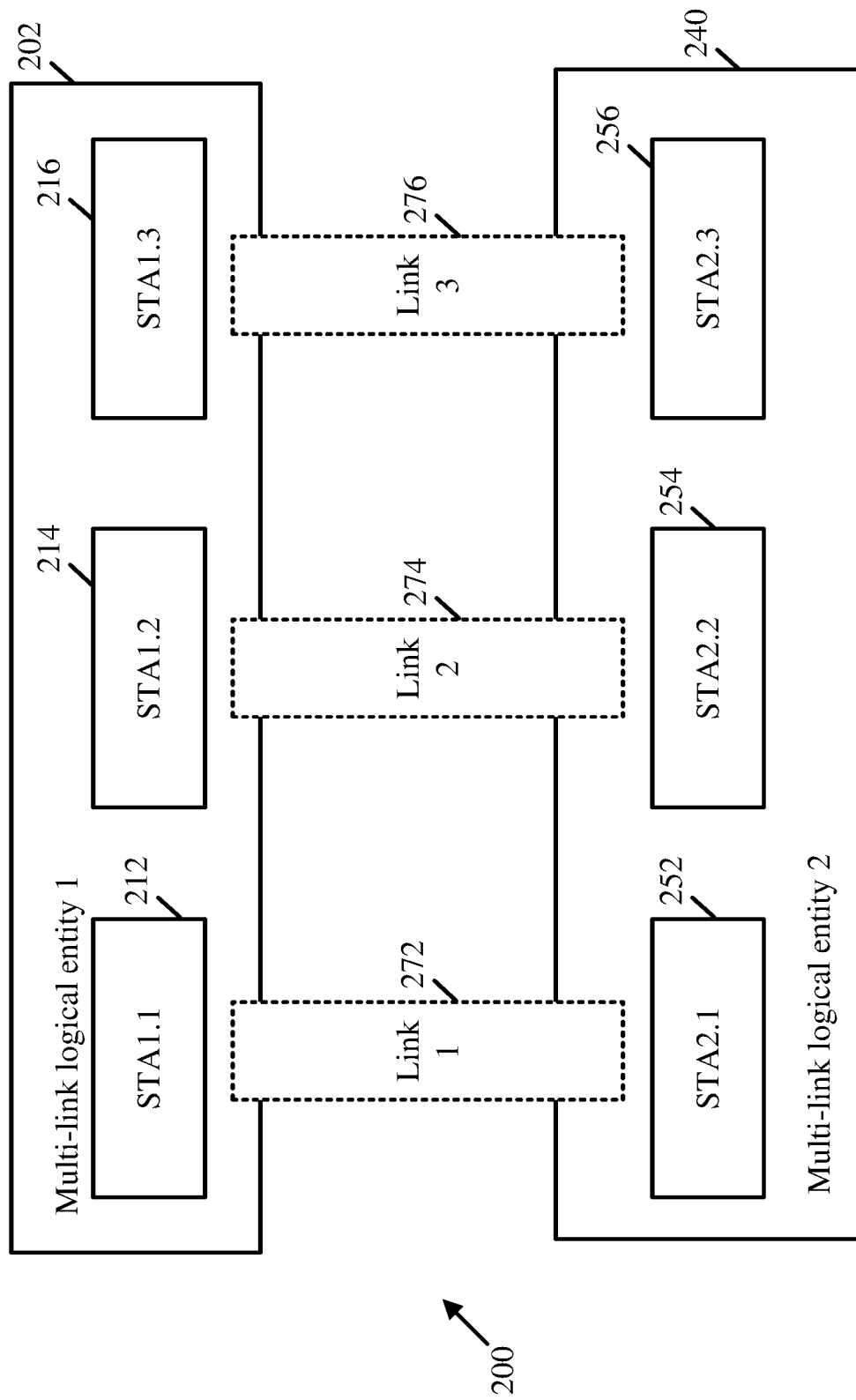
FIG. 2 is a schematic illustration of a multi-link communication scheme, which may be implemented in accordance with some demonstrative aspects.

Reference is made to FIG. 2, which schematically illustrates a multi-link communication scheme 200, which may be implemented in accordance with some demonstrative aspects.

As shown in FIG. 2, a first multi-link logical entity 202 ("multi-link logical entity 1"), e.g., a first MLD, may include a plurality of STAs, e.g., including a STA 212, a STA 214, and a STA 216. In one example, AP MLD 131 (FIG. 1) may perform one or more operations, one or more functionalities, the role of, and/or the functionality of, multi-link logical entity 202.

As shown in FIG. 2, a second multi-link logical entity 240 ("multi-link logical entity 2"), e.g., a second MLD, may include a plurality of STAs, e.g., including a STA 252, a STA 254, and a STA 256. In one example, MLD 151 (FIG. 1) may perform one or more operations, one or more functionalities, the role of, and/or the functionality of, multi-link logical entity 240.

As shown in FIG. 2, multi-link logical entity 202 and multi-link logical entity 240 may be configured to form, setup and/or communicate over a plurality of links, for example, including a link 272 between STA 212 and STA 252, a link 274 between STA 214 and STA 254, and/or a link 276 between STA 216 and STA 256.

Figure 3:
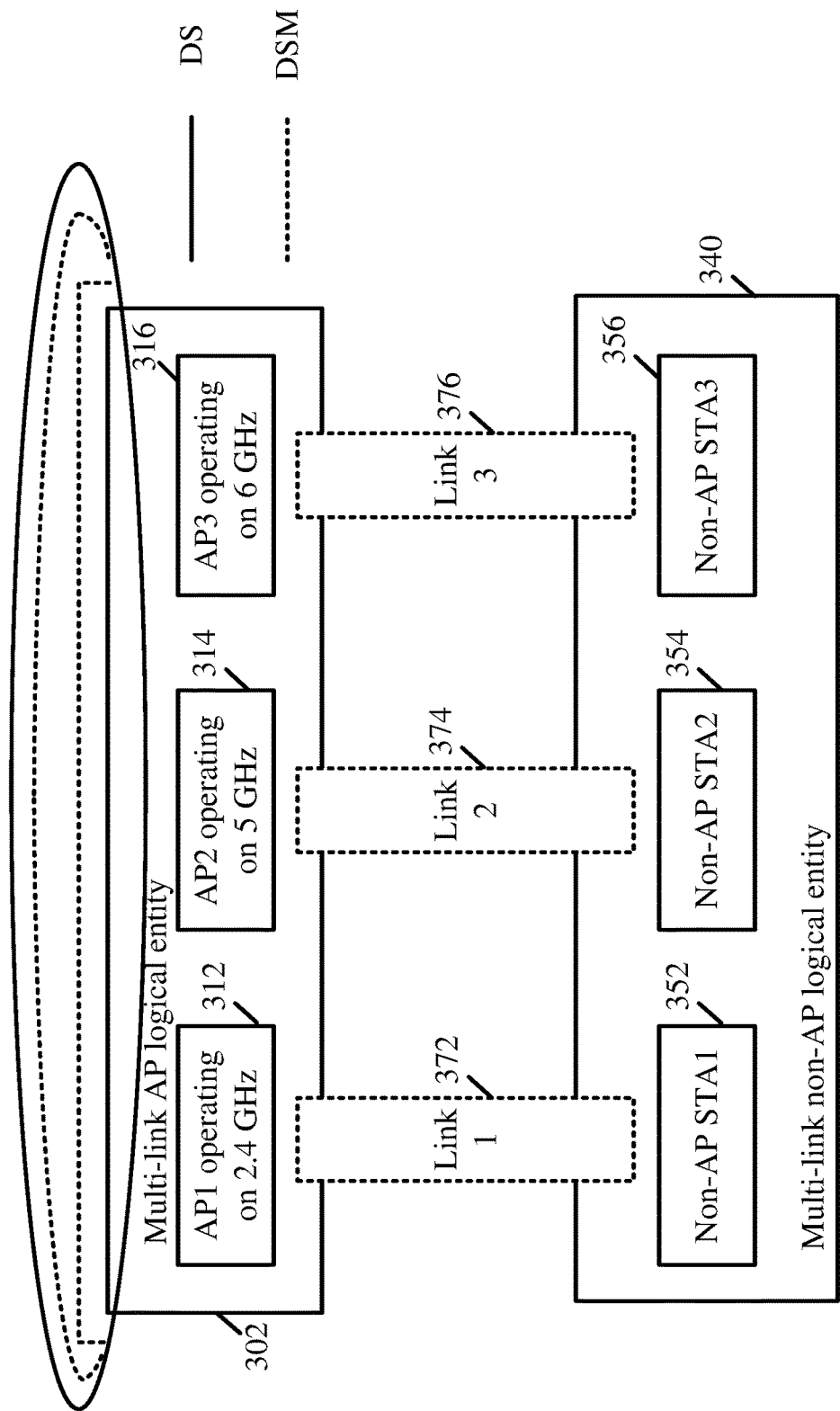
FIG. 3 is a schematic illustration of a multi-link communication scheme, which may be implemented in accordance with some demonstrative aspects.

Reference is made to FIG. 3, which schematically illustrates a multi-link communication scheme 300, which may be implemented in accordance with some demonstrative aspects.

As shown in FIG. 3, a multi-link AP logical entity 302, e.g., an AP MLD, may include a plurality of AP STAs, e.g., including an AP STA 312, an AP STA 314, and an AP STA 316. In one example, AP MLD 131 (FIG. 1) may perform one or more operations, one or more functionalities, the role of, and/or the functionality of, multi-link AP logical entity 302.

As shown in FIG. 3, a multi-link non-AP logical entity 340, e.g., a non-AP MLD, may include a plurality of non-AP STAs, e.g., including a non-AP STA 352, a non-AP STA 354, and a non-AP STA 356. In one example, MLD 151 (FIG. 1) may perform one or more operations, one or more functionalities, the role of, and/or the functionality of, multi-link non-AP logical entity 340.

As shown in FIG. 3, multi-link AP logical entity 302 and multi-link non-AP logical entity 340 may be configured to form, setup and/or communicate over a plurality of links, for example, including a link 372 between AP STA 312 and non-AP STA 352, a link 374 between AP STA 314 and non-AP STA 354, and/or a link 376 between AP STA 316 and non-AP STA 356.

For example, as shown in FIG. 3, multi-link AP logical entity 302 may include a multi-band AP MLD, which may be configured to communicate over a plurality of wireless communication frequency bands. For example, as shown in FIG. 3, AP STA 312 may be configured to communicate over a 2.4 Ghz frequency band, AP STA 314 may be configured to communicate over a 5 Ghz frequency band, and/or AP STA 316 may be configured to communicate over a 6 Ghz frequency band. In other aspects, AP STA 312, AP STA 314, and/or AP STA 316, may be configured to communicate over any other additional or alternative wireless communication frequency bands.

Referring back to FIG. 1, in some demonstrative aspects, devices 102 and/or 140 may be configured to implement a Stream Classification Service (SCS) procedure, which may be extended to apply across an MLD device, for example, in accordance with an *IEEE 802.11be Specification*, e.g., as described below.

In some demonstrative aspects, the SCS procedure may be configured to utilize a traffic specification (TSPEC) and/or a modified TSPEC variant, for example, to signal stream-specific parameters, for example, in addition to traffic classification parameters signaled for downlink (DL) traffic.

In some demonstrative aspects, there may be a need to provide a technical solution to address one or more potential issues of a new TSPEC design, which may have an interoperability issue, for example, if the new TSPEC design has a conflict with an old TSPEC design.

One possible technical solution may be to implement a light-weight element, for example, as an alternative to the TSPEC. For example, the light-weight element may be configured to signal the stream-specific parameters.

In one example, a proposal may exchange a new QoS Profile field that contains few QoS parameters of interest. In another example, a proposal may utilize a new TSPEC-lite element that carries a subset of parameters contained in TSPEC along, e.g., with new parameters. However, these proposals may have one or more technical issues, for example, as these proposals may fail to specify whether the signaling is contained in a new element, and/or fail to describe in detail regarding presence or absence of specific fields in the element.

In some demonstrative aspects, a Quality of Service (QoS) element may be configured to provide a technical solution to support signaling QoS parameters, for example, during a Stream Classification Service (SCS) procedure, e.g., as described below.

In some demonstrative aspects, the QoS element may be configured to provide a technical solution to support optimizing a length of the QoS element, for example, based on presence and/or absence of certain fields in the QoS element, e.g., as described below.

In some demonstrative aspects, the QoS element may be configured to provide a technical solution to support a more efficient implementation of the SCS procedure, for example, by supporting an indication of presence and/or absence of certain fields in the QoS element, e.g., as described below.

In some demonstrative aspects, devices 102 and/or 140 may be configured to generate, process and/or communicate one or more frames including a QoS element, e.g., as described below.

In some demonstrative aspects, the QoS element may include a control field, e.g., as described below.

In some demonstrative aspects, the control field may include presence signaling information corresponding to a plurality of parameter fields, e.g., as described below.

In some demonstrative aspects, the presence signaling information may be configured to indicate, for a parameter field of the plurality of parameter fields, whether the parameter field is to be present or absent in the QoS element, e.g., as described below.

In some demonstrative aspects, the presence or absence of the plurality of parameter fields in the QoS element may be configured, for example, according to the presence signaling information in the control field, e.g., as described below.

In some demonstrative aspects, controller 154 may be configured to control, trigger, cause, and/or instruct an EHT STA implemented by device 140, e.g., STA 155, to set a control field including presence signaling information corresponding to a plurality of parameter fields, e.g., as described below.

In some demonstrative aspects, the presence signaling information may be configured to indicate, for a parameter field of the plurality of parameter fields, whether the parameter field is to be present or absent in a QoS element, e.g., as described below.

In some demonstrative aspects, controller 154 may be configured to control, trigger, cause, and/or instruct the EHT STA implemented by device 140, e.g., STA 155, to transmit a frame including the QoS element, e.g., as described below.

In some demonstrative aspects, the QoS element may include the control field, e.g., as described below.

In some demonstrative aspects, the presence or absence of the plurality of parameter fields in the QoS element may be configured according to the presence signaling information in the control field, e.g., as described below.

In some demonstrative aspects, controller 124 may be configured to control, trigger, cause, and/or instruct an EHT STA implemented by device 102, e.g., AP 135, to process a control field in a QoS element in a received frame, e.g., as described below.

In some demonstrative aspects, the control field may include the presence signaling information corresponding to the plurality of parameter fields, e.g., as described below.

In some demonstrative aspects, controller 124 may be configured to control, trigger, cause, and/or instruct the EHT STA implemented by device 102, e.g., AP 135, to process the QoS element of the received frame by determining, for example, based on the presence signaling information, whether the parameter field of the plurality of parameter fields is present or absent in the QoS element, e.g., as described below.

For example, device 140 may be configured to generate and/or transmit to device 102 the frame including the QoS element including the control field.

For example, device 102 may be configured to receive and/or process the frame from device 140 including the QoS element including the control field.

In some demonstrative aspects, the frame may include an SCS frame of an SCS procedure, e.g., as described below.

In some demonstrative aspects, the frame may include an SCS request frame of an SCS procedure, e.g., as described below.

In some demonstrative aspects, the SCS procedure may include an SCS procedure between a first MLD and a second MLD, e.g., as described below.

In some demonstrative aspects, the EHT STA implemented by device 140 may include, operate as, perform the role of, and/or perform one or more functionalities of, an EHT STA of a first MLD, e.g., MLD 151.

In some demonstrative aspects, the EHT STA implemented by device 102 may include, operate as, perform the role of, and/or perform one or more functionalities of, an EHT STA of a second MLD, e.g., AP MLD 131.

In some demonstrative aspects, controller 154 may be configured to control, trigger, cause, and/or instruct the EHT STA implemented by device 140, e.g., STA 155, to transmit the frame as part of an SCS procedure between a first MLD, e.g., MLD 151, and a second MLD, e.g., an MLD of device 102.

In some demonstrative aspects, controller 154 may be configured to control, trigger, cause, and/or instruct the EHT STA implemented by device 140, e.g., STA 155, to transmit the frame from a non-AP EHT STA, e.g., STA 155, to an EHT AP, e.g., an EHT AP implemented by device 102.

In some demonstrative aspects, controller 124 may be configured to control, trigger, cause, and/or instruct the EHT STA implemented by device 102, e.g., AP 135, to process the frame received from the non-AP EHT STA implemented by device 140.

For example, controller 154 may cause the non-AP EHT STA implemented by device 140 to generate and/or transmit the SCS request frame including the QoS element to the EHT AP implemented by device 102.

For example, controller 124 may cause the EHT AP implemented by device 102 to receive and/or process the SCS request frame from the non-AP EHT STA implemented by device 140.

In some demonstrative aspects, the control field in the QoS element may include a presence bitmap including a plurality of bits corresponding to the plurality of parameter fields, respectively, e.g. as described below.

In some demonstrative aspects, a value of a bit in the bitmap parameter field corresponding to the parameter field may be configured to indicate whether the parameter field is to be present or absent in the QoS element, e.g. as described below.

In some demonstrative aspects, controller 154 may be configured to control, trigger, cause, and/or instruct the EHT STA implemented by device 140, e.g., STA 155, to set to 1 a bit in the presence bitmap corresponding to a parameter field to be present in the QoS element, and to configure the QoS element to include the parameter field to be present in the QoS element, e.g. as described below.

In some demonstrative aspects, a bit in the presence bitmap corresponding to a parameter field which is absent from the QoS element may be 0.

In some demonstrative aspects, controller 124 may be configured to control, trigger, cause, and/or instruct the EHT STA implemented by device 102, e.g., STA 135, to determine, based on a bit having a bit value of 1 in the presence bitmap, that a parameter field corresponding to the bit having the bit value of 1 is present in the QoS element.

In some demonstrative aspects, controller 124 may be configured to control, trigger, cause, and/or instruct the EHT STA implemented by device 102, e.g., STA 135, to determine, based on a bit having a bit value of 0 in the presence bitmap, that a parameter field corresponding to the bit having the bit value of 0 is absent from the QoS element.

In some demonstrative aspects, the plurality of parameter fields in the QoS element may include a maximum Medium Access Control (MAC) Service Data Unit (MSDU) size field, e.g., as described below.

In some demonstrative aspects, the plurality of parameter fields may include a mean data rate field, e.g., as described below.

In some demonstrative aspects, the plurality of parameter fields may include a delivery ratio field, e.g., as described below.

In some demonstrative aspects, the plurality of parameter fields may include a medium time field, e.g., as described below.

In some demonstrative aspects, the plurality of parameter fields may include a bandwidth field to indicate a bandwidth of a link, e.g., as described below.

In some demonstrative aspects, the plurality of parameter fields may include a size field, e.g., as described below.

In some demonstrative aspects, the plurality of parameter fields may include a time field, e.g., as described below.

In some demonstrative aspects, the plurality of parameter fields may include any other additional or alternative parameter fields.

In some demonstrative aspects, the QoS element may include a plurality of predefined parameter fields, e.g., as described below.

In some demonstrative aspects, the presence signaling information may be configured to correspond to a plurality of additional parameter fields, which may be, for example, different from the plurality of predefined parameter fields, e.g., as described below.

In some demonstrative aspects, the QoS element may be configured according to a QoS element format, e.g., as described below.

In some demonstrative aspects, the QoS element format may include the plurality of predefined parameter fields after the control field, e.g., as described below.

In some demonstrative aspects, the QoS element format may include the plurality of parameter fields after the plurality of predefined parameter fields, e.g., as described below.

In other aspects, the QoS element format may be configured to include any other additional or alternative elements, and/or any other order and/or format of the plurality of predefined parameter fields and/or the plurality of additional fields.

In some demonstrative aspects, the plurality of predefined parameter fields may include a minimum service interval field, e.g., as described below.

In some demonstrative aspects, the plurality of predefined parameter fields may include a maximum service interval field, e.g., as described below.

In some demonstrative aspects, the plurality of predefined parameter fields may include a minimum data rate field, e.g., as described below.

In some demonstrative aspects, the plurality of predefined parameter fields may include a delay bound field, e.g., as described below.

In some demonstrative aspects, the plurality of predefined parameter fields may include any other additional or alternative predefined parameter fields.

In some demonstrative aspects, the QoS element may include one or more fields before the presence signaling information, e.g., as described below.

In some demonstrative aspects, the QoS element may include a Traffic Identifier (TID) field and/or a direction field, e.g., as described below.

In some demonstrative aspects, the presence signaling information may be after the TID field and/or the direction field, e.g., as described below.

In some demonstrative aspects, the plurality of parameter fields may include stream-specific parameter fields, e.g., as described below.

In some demonstrative aspects, device 102 and/or device 140 may be configured to generate, transmit, receive and/or process an information element, e.g., a lite-weight element, carrying traffic stream parameters, for example, as a QoS element, e.g., as described below.

In some demonstrative aspects, the QoS element may be configured in the form of a QoS Parameters Element (QPE), e.g., as described below.

In some demonstrative aspects, the QoS element, e.g., the QPE, may be signaled in an SCS request frame, e.g., transmitted from a client to an AP.

For example, device 140 may be configured to transmit the QoS element, e.g., the QPE, to device 102, for example, as part of an SCS request frame.

In some demonstrative aspects, the QoS element, e.g., the QPE, may include a control field configured to signal the presence or absence of one or more certain fields, e.g., as described below.

In some demonstrative aspects, the control field may include a bitmap field where a bit value set to 1 signals whether a particular parameter is present in the QoS element, for example, in the QPE, e.g., as described below.

Figure 4:
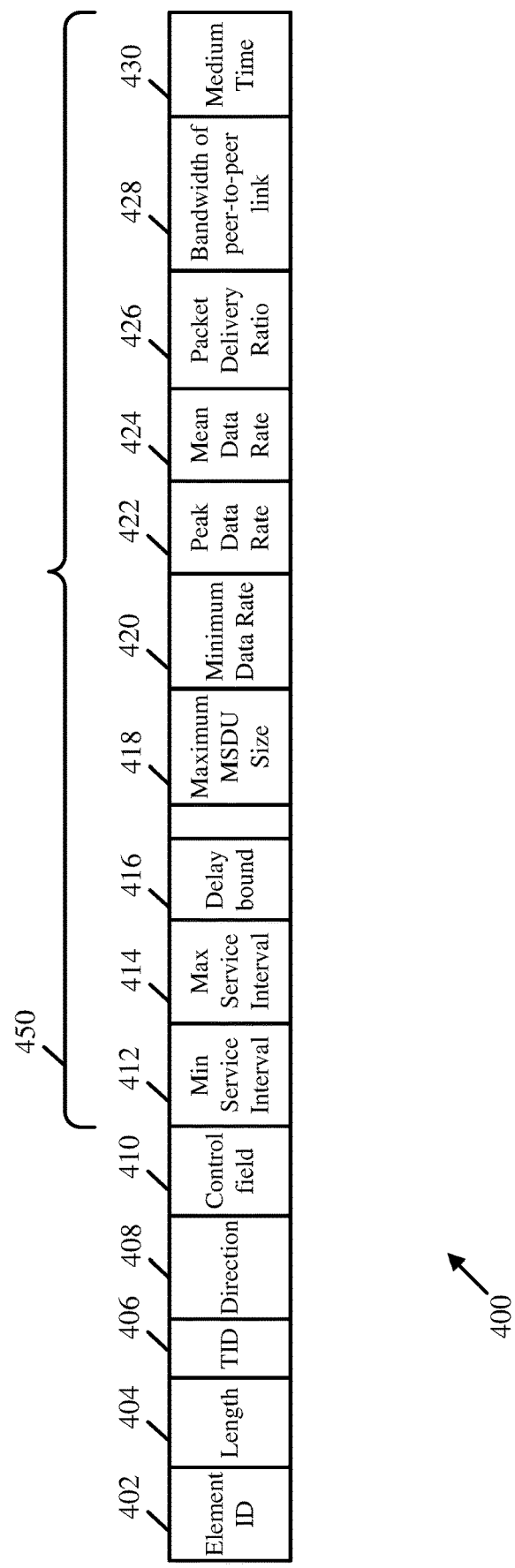
FIG. 4 is a schematic illustration of a Quality of Service (QoS) element, in accordance with some demonstrative aspects.

Reference is made to FIG. 4, which schematically illustrates a QoS element 400, in accordance with some demonstrative aspects.

In some demonstrative aspects, device 140 (FIG. 1) and/or device 102 may be configured to communicate a frame including QoS element 400. For example, device 140 (FIG. 1) may be configured to transmit to device 102 (FIG. 1) the frame including QoS element 400; and/or device 102 (FIG. 1) may be configured to receive from device 140 (FIG. 1) the frame including QoS element 400.

As shown in FIG. 4, QoS element 400 may include a plurality of parameter fields 450, e.g., as described below.

In some demonstrative aspects, as shown in FIG. 4, QoS element 400 may include a control field 410 including presence signaling information corresponding to the plurality of parameter fields 450, e.g., as described below.

In some demonstrative aspects, the presence signaling information may be configured to indicate, for a parameter field of the plurality of parameter fields 450, whether the parameter field is to be present or absent in the QoS element 400, e.g., as described below.

In some demonstrative aspects, as shown in FIG. 4, the plurality of parameter fields 450 may include a minimum (Min) service interval field 412. In one example, minimum service interval field 412 may be located after control field 410.

In some demonstrative aspects, as shown in FIG. 4, the plurality of parameter fields 450 may include a maximum (Max) service interval field 414. In one example, maximum service interval field 414 may be after minimum service interval field 412. In another example, maximum service interval field 414 may be located at any other alternative location in QoS element 400.

In some demonstrative aspects, as shown in FIG. 4, the plurality of parameter fields 450 may include a delay bound field 416. In one example, delay bound field 416 may be after maximum service interval field 414. In other example, delay bound field 416 may be located at any other alternative location in QoS element 400.

In some demonstrative aspects, as shown in FIG. 4, the plurality of parameter fields 450 may include a size field, e.g., as described below.

In some demonstrative aspects, as shown in FIG. 4, the plurality of parameter fields 450 may include a maximum MSDU size field 418. In one example, maximum MSDU size field 418 may be after delay bound field 416. In other example, maximum MSDU size field 418 may be located at any other alternative location in QoS element 400.

In some demonstrative aspects, as shown in FIG. 4, the plurality of parameter fields 450 may include a minimum data rate field 420. In one example, minimum data rate field 420 may be after maximum MSDU size field 418. In other example, minimum data rate field 420 may be located at any other alternative location in QoS element 400.

In some demonstrative aspects, as shown in FIG. 4, the plurality of parameter fields 450 may include a peak data rate field 422. In one example, peak data rate field 422 may be after minimum data rate field 420. In other example, peak data rate field 422 may be located at any other alternative location in QoS element 400.

In some demonstrative aspects, as shown in FIG. 4, the plurality of parameter fields 450 may include a mean data rate field 424. In one example, mean data rate field 424 may be after peak data rate field 422. In other example, mean data rate field 424 may be located at any other alternative location in QoS element 400.

In some demonstrative aspects, as shown in FIG. 4, the plurality of parameter fields 450 may include a packet delivery ratio field 426. In one example, packet delivery ratio field 426 may be after mean data rate field 424. In other example, packet delivery ratio field 426 may be located at any other alternative location in QoS element 400.

In some demonstrative aspects, as shown in FIG. 4, the plurality of parameter fields 450 may include a bandwidth field 428. For example, bandwidth field 428 may be configured to indicate a bandwidth of a link. In one example, as shown in FIG. 4, bandwidth field 428 may include a peer-to-peer bandwidth field to indicate a bandwidth of a peer-to-peer link. In other aspects, bandwidth field 428 may be configured to indicate any other bandwidth of any other link. In one example, bandwidth field 428 may be after packet delivery ratio field 426. In other example, bandwidth field 428 may be located at any other alternative location in QoS element 400.

In some demonstrative aspects, as shown in FIG. 4, the plurality of parameter fields 450 may include a medium time field 430. In one example, medium time field 430 may be after bandwidth field 428. In other example, medium time field 430 may be located at any other alternative location in QoS element 400.

In some demonstrative aspects, the plurality of parameter fields 450 may include one or more of, e.g., some or all of, the fields 412, 414, 416, 418, 420, 422, 424, 426, 428 and/or 430. In other aspects, the plurality of parameter fields 450 may include any other additional or alternative parameter fields.

In some demonstrative aspects, as shown in FIG. 4, QoS element 400 may include one or more fields before the control field 410, e.g., as described below.

In some demonstrative aspects, as shown in FIG. 4, QoS element 400 may include an element ID field 402, a length field 404, a TID field 406, and/or a direction field 408.

In some demonstrative aspects, control field 410 may be after the element ID field 402, the length field 404, the TID field 406, and/or the direction field 408.

In some demonstrative aspects, one or more of, e.g., some or all of, the parameter fields 412, 414, 416, 418, 420, 422, 424, 426, 428 and/or 430 may be selectively present in or absent from the QoS element 400.

In some demonstrative aspects, presence or absence of one or more of, e.g., some or all of, the parameter fields 412, 414, 416, 418, 420, 422, 424, 426, 428 and/or 430 in the QoS element 400 may be configured according to the presence signaling information in the control field 410.

In some demonstrative aspects, control field 410 may include a presence bitmap to indicate the presence signaling information corresponding to the parameter fields 412, 414, 416, 418, 420, 422, 424, 426, 428 and/or 430, e.g., as described below.

Figure 5:
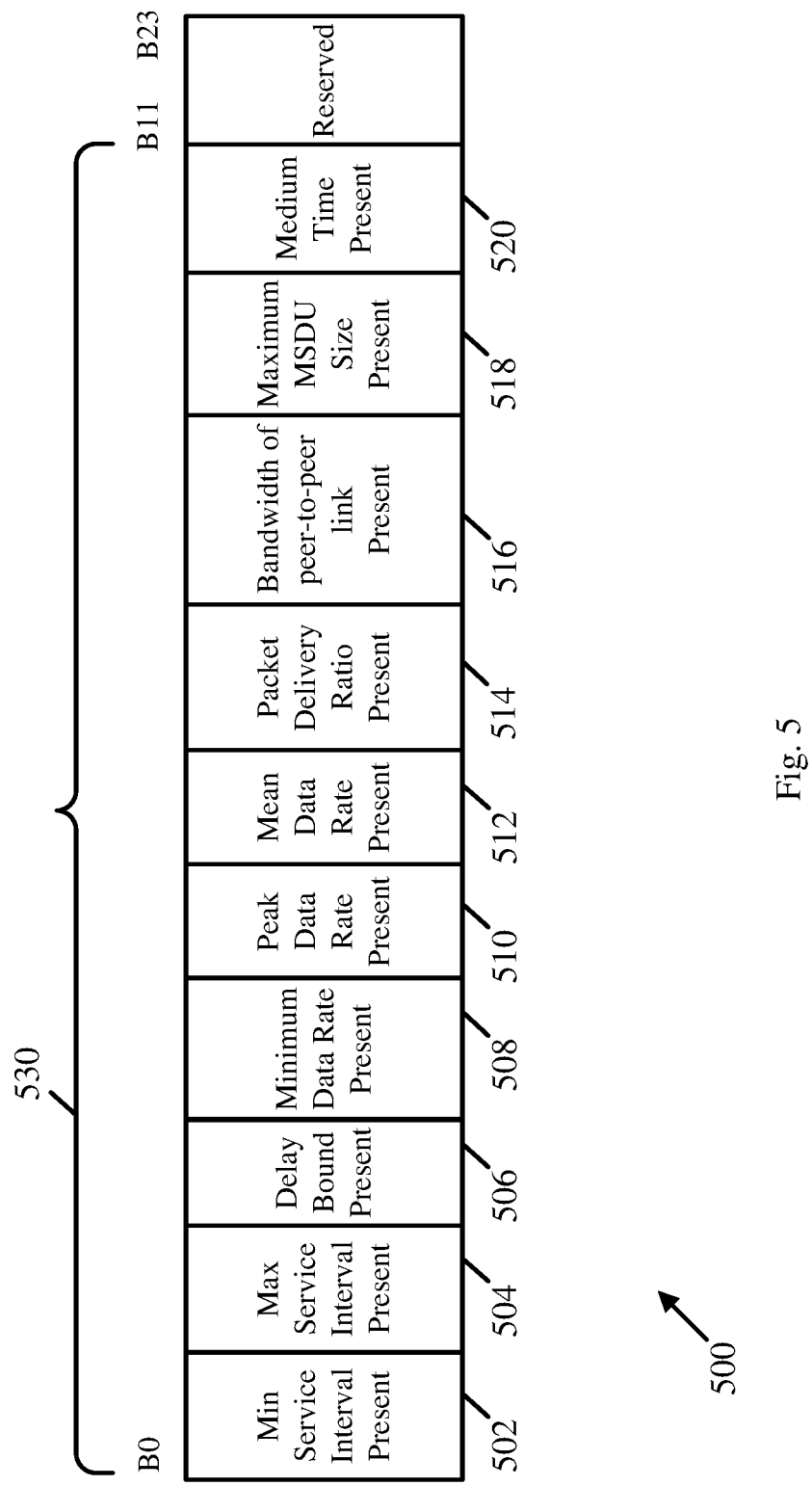
FIG. 5 is a schematic illustration of a control field, in accordance with some demonstrative aspects.

Reference is made to FIG. 5, which schematically illustrates a control field 500, in accordance with some demonstrative aspects. For example, control field 410 (FIG. 4) may include one or more elements of control field 500.

In some demonstrative aspects, device 140 (FIG. 1) and/or device 102 may be configured to communicate a QoS element including control field 500. For example, device 140 (FIG. 1) may be configured to transmit to device 102 (FIG. 1) a QoS element, e.g., QoS element 400 (FIG. 4), including control field 500; and/or device 102 (FIG. 1) may be configured to receive from device 140 (FIG. 1) a QoS element, e.g., QoS element 400 (FIG. 4), including control field 500.

In some demonstrative aspects, control field 500 may include a presence bitmap, e.g., as described below.

In some demonstrative aspects, the presence bitmap may include a plurality of bits 530 corresponding to a plurality of parameter fields of a QoS element, respectively. For example, the plurality of bits 530 may correspond to the plurality of parameter fields 450 (FIG. 4) of QoS element 400 (FIG. 4). For example, the plurality of bits 530 may include a plurality of bits corresponding to the parameter fields 412, 414, 416, 418, 420, 422, 424, 426, 428 and/or 430, respectively.

In some demonstrative aspects, a value of a bit in the presence bitmap corresponding to a parameter field of the plurality of parameter fields of a QoS element, e.g., QoS element 400 (FIG. 4), may indicate whether the parameter field is to be present or absent in the QoS element, e.g., as described below.

In some demonstrative aspects, a bit value set to 1 in the presence bitmap may correspond to a parameter field to be present in QoS element 400 (FIG. 4), e.g., as described below. For example, QoS element 400 (FIG. 4) may be configured to include a parameter field, which is indicated by the presence bitmap to be present in the QoS element 400 (FIG. 4).

In some demonstrative aspects, a bit value of 0 in the presence bitmap may correspond to a parameter field which is absent from QoS element 400 (FIG. 4).

In some demonstrative aspects, as shown in FIG. 5, a minimum service interval present bit 502 may be configured to indicate presence or absence of minimum service interval field 412 (FIG. 4) in QoS element 400 (FIG. 4).

In one example, a bit value of minimum service interval present bit 502 may be set to 1, for example, to indicate the presence of minimum service interval field 412 (FIG. 4) in QoS element 400 (FIG. 4). In another example, a bit value of minimum service interval present bit 502 may be 0, for example, to indicate an absence of minimum service interval field 412 (FIG. 4) from QoS element 400 (FIG. 4).

In some demonstrative aspects, as shown in FIG. 5, a maximum service interval present bit 504 may be configured to indicate presence or absence of maximum service interval field 414 (FIG. 4) in QoS element 400 (FIG. 4).

In one example, a bit value of maximum service interval present bit 504 may be set to 1, for example, to indicate a presence of maximum service interval field 414 (FIG. 4) in QoS element 400 (FIG. 4). In another example, a bit value of maximum service interval present bit 504 may be 0, for example, to indicate an absence of maximum service interval field 414 (FIG. 4) from QoS element 400 (FIG. 4).

In some demonstrative aspects, as shown in FIG. 5, a delay bound present bit 506 may be configured to indicate presence or absence of delay bound field 416 (FIG. 4) in QoS element 400 (FIG. 4).

In one example, a bit value of delay bound present bit 506 may be set to 1, for example, to indicate a presence of delay bound field 416 (FIG. 4) in QoS element 400 (FIG. 4). In another example, a bit value of delay bound present bit 506 may be 0, for example, to indicate an absence of delay bound field 416 (FIG. 4) from QoS element 400 (FIG. 4).

In some demonstrative aspects, as shown in FIG. 5, a minimum data rate present bit 508 may be configured to indicate presence or absence of minimum data rate field 420 (FIG. 4) in QoS element 400 (FIG. 4).

In one example, a bit value of minimum data rate present bit 508 may be set to 1, for example, to indicate a presence of minimum data rate field 420 (FIG. 4) in QoS element 400 (FIG. 4). In another example, a bit value of minimum data rate present bit 508 may be 0, for example, to indicate an absence of minimum data rate field 420 (FIG. 4) from QoS element 400 (FIG. 4).

In some demonstrative aspects, as shown in FIG. 5, a peak data rate present bit 510 may be configured to indicate presence or absence of peak data rate field 422 (FIG. 4) in QoS element 400 (FIG. 4).

In one example, a bit value of peak data rate present bit 510 may be set to 1, for example, to indicate a presence of peak data rate field 422 (FIG. 4) in QoS element 400 (FIG. 4). In another example, a bit value of peak data rate present bit 510 may be 0, for example, to indicate an absence of peak data rate field 422 (FIG. 4) from QoS element 400 (FIG. 4).

In some demonstrative aspects, as shown in FIG. 5, a mean data rate present bit 512 may be configured to indicate presence or absence of mean data rate field 424 (FIG. 4) in QoS element 400 (FIG. 4).

In one example, a bit value of mean data rate present bit 512 may be set to 1, for example, to indicate a presence of mean data rate field 424 (FIG. 4) in QoS element 400 (FIG. 4). In another example, a bit value of mean data rate present bit 512 may be 0, for example, to indicate an absence of mean data rate field 424 (FIG. 4) from QoS element 400 (FIG. 4).

In some demonstrative aspects, as shown in FIG. 5, a packet delivery ratio present bit 514 may be configured to indicate presence or absence of packet delivery ratio field 426 (FIG. 4) in QoS element 400 (FIG. 4).

In one example, a bit value of packet delivery ratio present bit 514 may be set to 1, for example, to indicate a presence of packet delivery ratio field 426 (FIG. 4) in QoS element 400 (FIG. 4). In another example, a bit value of packet delivery ratio present bit 514 may be 0, for example, to indicate an absence of packet delivery ratio field 426 (FIG. 4) from QoS element 400 (FIG. 4).

In some demonstrative aspects, as shown in FIG. 5, a bandwidth of P2P link present bit 516 may be configured to indicate presence or absence of bandwidth field 428 (FIG. 4) in QoS element 400 (FIG. 4).

In one example, a bit value of bandwidth of P2P link present bit 516 may be set to 1, for example, to indicate a presence of bandwidth field 428 (FIG. 4) in QoS element 400 (FIG. 4). In another example, a bit value of bandwidth of P2P link present bit 516 may be 0, for example, to indicate an absence of bandwidth field 428 (FIG. 4) from QoS element 400 (FIG. 4).

In some demonstrative aspects, as shown in FIG. 5, a maximum MSDU size present bit 518 may be configured to indicate presence or absence of maximum MSDU size field 418 (FIG. 4) in QoS element 400 (FIG. 4).

In one example, a bit value of maximum MSDU size present bit 518 may be set to 1, for example, to indicate a presence of maximum MSDU size field 418 (FIG. 4) in QoS element 400 (FIG. 4). In another example, a bit value of maximum MSDU size present bit 518 may be 0, for example, to indicate an absence of maximum MSDU size field 418 (FIG. 4) from QoS element 400 (FIG. 4).

In some demonstrative aspects, as shown in FIG. 5, a medium time present bit 520 may be configured to indicate presence or absence of medium time field 430 (FIG. 4) in QoS element 400 (FIG. 4).

In one example, a bit value of medium time present bit 520 may be set to 1, for example, to indicate a presence of medium time field 430 (FIG. 4) in QoS element 400 (FIG. 4). In another example, a bit value of medium time present bit 520 may be 0, for example, to indicate an absence of medium time field 430 (FIG. 4) from QoS element 400 (FIG. 4).

Referring back to FIG. 1, in some demonstrative aspects, device 102 and/or device 140 may be configured to generate, transmit, receive and/or process a QoS element, e.g., a QEP, configured such that some of the fields in the QoS element may include field ("mandatory field"), which may be assumed to be present in the QoS element, e.g., always. In this case the bitmap field may be configured to signal presence and/or absence of one or more optional fields to be included in the QoS element, e.g., as described below.

Figure 6:
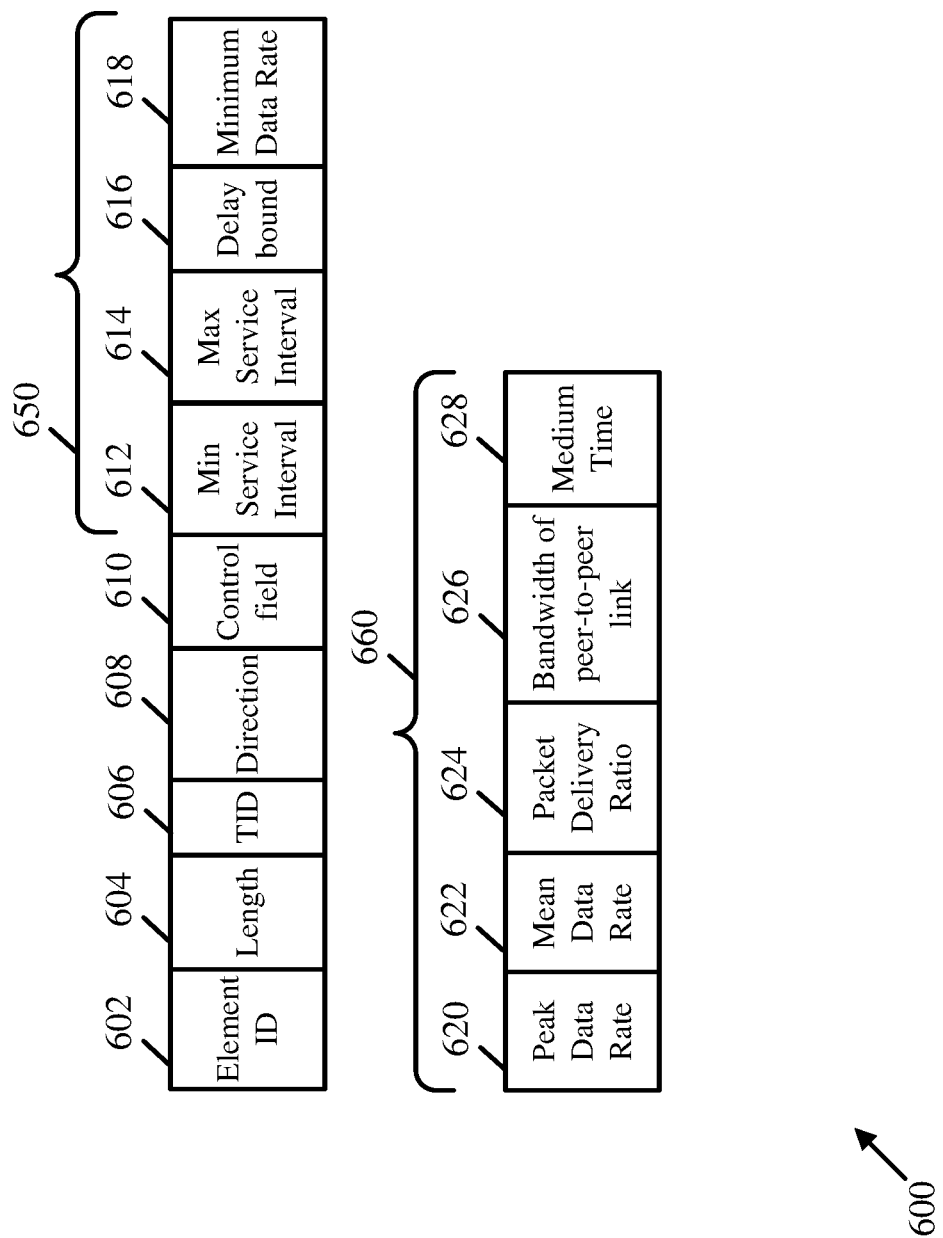
FIG. 6 is a schematic illustration of a QoS element, in accordance with some demonstrative aspects.

Reference is made to FIG. 6, which schematically illustrates a QoS element 600, in accordance with some demonstrative aspects.

In some demonstrative aspects, device 140 (FIG. 1) and/or device 102 may be configured to communicate a frame including QoS element 600. For example, device 140 (FIG. 1) may be configured to transmit to device 102 (FIG. 1) the frame including QoS element 600; and/or device 102 (FIG. 1) may be configured to receive from device 140 (FIG. 1) the frame including QoS element 600.

As shown in FIG. 6, QoS element 600 may include a plurality of parameter fields, e.g., as described below.

In some demonstrative aspects, as shown in FIG. 6, QoS element 600 may include a control field 610 including presence signaling information corresponding to a plurality of parameter fields, e.g., as described below.

In some demonstrative aspects, the presence signaling information may be configured to indicate, for a parameter field of the plurality of parameter fields, whether the parameter field is to be present or absent in QoS element 600, e.g., as described below.

In some demonstrative aspects, QoS element 600 may be configured according to a QoS element format, e.g., as described below.

In some demonstrative aspects, as shown in FIG. 6, QoS element 600 may include a plurality of predefined parameter fields 650. For example, the plurality of predefined parameter fields 650 may be assumed to be present in QoS element 600, e.g., always.

In some demonstrative aspects, as shown in FIG. 6, the plurality of predefined parameter fields 650 may include a minimum service interval field 612. In one example, minimum service interval field 612 may be after control field 610.

In some demonstrative aspects, as shown in FIG. 6, the plurality of predefined parameter fields 650 may include a maximum service interval field 614. In one example, maximum service interval field 614 may be after minimum service interval field 612. In another example, maximum service interval field 614 may be located in any other alternative location in QoS element 600.

In some demonstrative aspects, as shown in FIG. 6, the plurality of predefined parameter fields 650 may include a delay bound field 616. In one example, delay bound field 616 may be after maximum service interval field 614. In another example, delay bound field 616 may be located in any other alternative location in QoS element 600.

In some demonstrative aspects, as shown in FIG. 6, the plurality of predefined parameter fields 650 may include a minimum data rate field 618. In one example, minimum data rate field 618 may be after delay bound field 616. In another example, minimum data rate field 618 may be located in any other alternative location in QoS element 600.

In some demonstrative aspects, the plurality of predefined parameter fields 650 may include one or more of, e.g., some or all of, the fields 612, 614, 616, and/or 618. In other aspects, the plurality of predefined parameter fields 650 may include any other additional or alternative parameter fields.

In some demonstrative aspects, QoS element 600 may include a plurality of parameter fields 660 after the plurality of predefined parameter fields 650, e.g., as described below.

In some demonstrative aspects, as shown in FIG. 6, QoS element 600 may include a plurality of additional parameter fields 660. In one example, the plurality of additional parameter fields 660 may be after plurality the of predefined parameter fields 650. In another example, the plurality of additional parameter fields 660 may be located in any other alternative location in QoS element 600.

In some demonstrative aspects, control field 610 may include presence signaling information configured to correspond to plurality of additional parameter fields 660, e.g., different from plurality of predefined parameter fields 650.

For example, the presence signaling information may be configured to signal for a parameter field of plurality of additional parameter fields 660, whether the parameter field is to be present or absent in QoS element 600.

In some demonstrative aspects, as shown in FIG. 6, the plurality of additional parameter fields 660 may include a peak data rate field 620. In one example, peak data rate field 620 may be after minimum data rate field 618. In another example, peak data rate field 620 may be located in any other alternative location in QoS element 600.

In some demonstrative aspects, as shown in FIG. 6, the plurality of additional parameter fields 660 may include a mean data rate field 620. In one example, mean data rate field 622 may be after peak data rate field 620. In another example, mean data rate field 622 may be located in any other alternative location in QoS element 600.

In some demonstrative aspects, as shown in FIG. 6, the plurality of additional parameter fields 660 may include a packet delivery ratio field 624. In one example, packet delivery ratio field 624 may be after mean data rate field 622. In another example, packet delivery ratio field 624 may be located in any other alternative location in QoS element 600.

In some demonstrative aspects, as shown in FIG. 6, the plurality of additional parameter fields 660 may include a bandwidth field 626. For example, bandwidth field 626 may be configured to indicate a bandwidth of a link. In one example, as shown in FIG. 6, bandwidth field 626 may include a peer-to-peer bandwidth field to indicate a bandwidth of a peer-to-peer link. In other aspects, bandwidth field 626 may be configured to indicate any other bandwidth of any other link. In one example, bandwidth field 626 may be after packet delivery ratio field 624. In another example, bandwidth field 626 may be located in any other alternative location in QoS element 600.

In some demonstrative aspects, as shown in FIG. 6, the plurality of additional parameter fields 660 may include a medium time field 628. In one example, medium time field 628 may be after bandwidth field 626. In another example, medium time field 628 may be located in any other alternative location in QoS element 600.

In some demonstrative aspects, the plurality of additional parameter fields 660 may include one or more of, e.g., some or all of, the fields 620, 622, 624, 626, and/or 628. In other aspects, the plurality of additional parameter fields 660 may include any other additional or alternative parameter fields.

In some demonstrative aspects, as shown in FIG. 6, QoS element 600 may include one or more fields before the control field 610, e.g., as described below.

In some demonstrative aspects, as shown in FIG. 6, QoS element 600 may include an element ID field 602, a length field 604, a TID field 606, and/or a direction field 608.

In some demonstrative aspects, control field 610 may be after the element ID field 602, the length field 604, the TID field 606, and/or the direction field 608.

In some demonstrative aspects, one or more of, e.g., some or all of, the parameter fields 620, 622, 624, 626 and/or 628 may be selectively present in or absent from the QoS element 600.

In some demonstrative aspects, presence or absence of one or more of, e.g., some or all of, the parameter fields 620, 622, 624, 626 and/or 628 in the QoS element 600 may be configured according to the presence signaling information in the control field 610.

In some demonstrative aspects, control field 610 may include a presence bitmap to indicate the presence signaling information corresponding to the parameter fields 620, 622, 624, 626 and/or 628, e.g., as described below.

Figure 7:
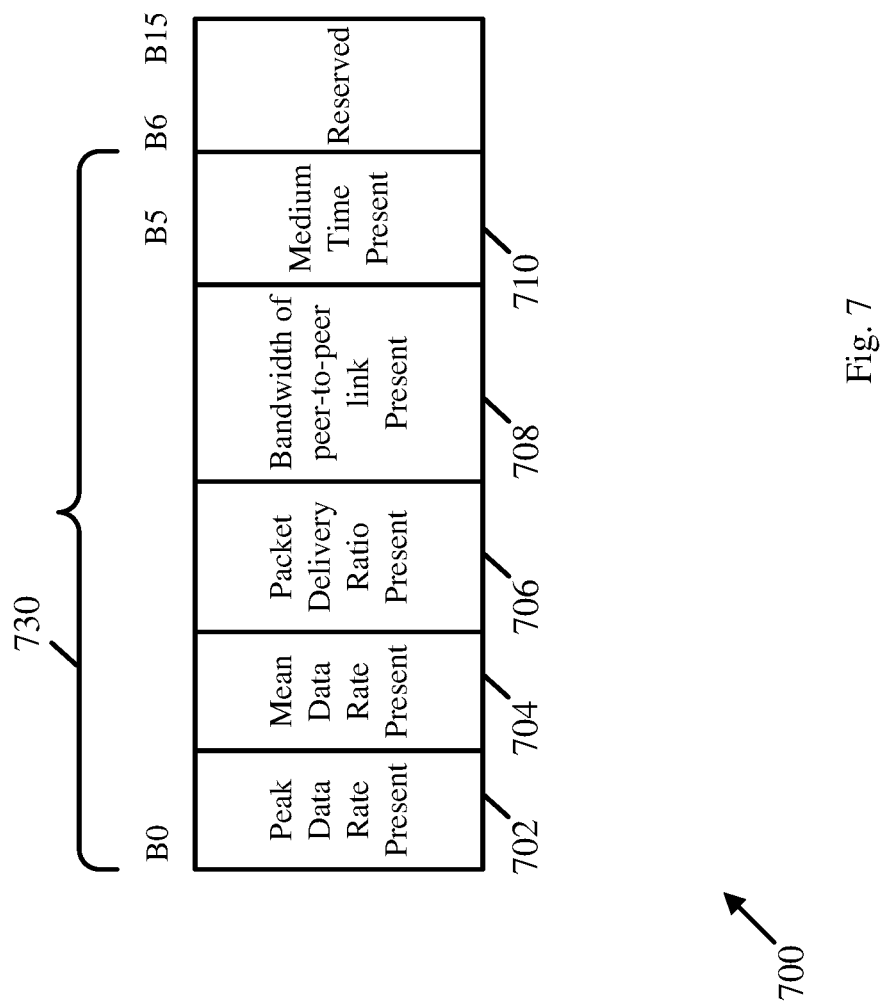
FIG. 7 is a schematic illustration of a control field, in accordance with some demonstrative aspects.

Reference is made to FIG. 7, which schematically illustrates a control field 700, in accordance with some demonstrative aspects. For example, control field 610 (FIG. 6) may include one or more elements of control field 700.

In some demonstrative aspects, device 140 (FIG. 1) and/or device 102 may be configured to communicate QoS element 600 (FIG. 6) including control field 700. For example, device 140 (FIG. 1) may be configured to transmit to device 102 (FIG. 1) a QoS element, e.g., QoS element 600 (FIG. 6), including control field 700; and/or device 102 (FIG. 1) may be configured to receive from device 140 (FIG. 1) a QoS element, e.g., QoS element 600 (FIG. 6), including control field 700.

In some demonstrative aspects, control field 700 may include a presence bitmap, e.g., as described below.

In some demonstrative aspects, the presence bitmap may be configured to signal presence or absence of certain parameter fields, e.g., as described below.

In some demonstrative aspects, the presence bitmap may be configured to signal presence or absence of a plurality of parameter fields of a QoS element, e.g., as described below.

In one example, the presence bitmap may be configured to exclude signaling presence or absence of parameter fields which are present, e.g., mandatorily.

In some demonstrative aspects, the presence bitmap may include a plurality of bits 730 corresponding to a plurality of parameter fields of a QoS element, respectively. For example, the plurality of bits 730 may correspond to the plurality of additional parameter fields of QoS element 600 (FIG. 6), e.g., the plurality of additional parameter fields 660 (FIG. 6). For example, the plurality of bits 730 may include a plurality of bits corresponding to the parameter fields 620, 622, 624, 626 and/or 628, respectively.

In some demonstrative aspects, a value of a bit in the presence bitmap corresponding to a parameter field of the plurality of parameter fields of a QoS element, e.g., QoS element 600 (FIG. 6), may indicate whether the parameter field is to be present or absent, e.g., as described below.

In some demonstrative aspects, a bit value set to 1 in the presence bitmap may correspond to a parameter field to be present in QoS element 600 (FIG. 6), e.g., as described below. For example, QoS element 600 (FIG. 6) may be configured to include the parameter field, which is indicated by the presence bitmap to be present in the QoS element 600 (FIG. 6).

In some demonstrative aspects, a bit value of 0 in the presence bitmap may correspond to a parameter field which is absent from QoS element 600 (FIG. 6).

In some demonstrative aspects, as shown in FIG. 7, a peak data rate present bit 702 may be configured to indicate presence or absence of peak data rate field 620 (FIG. 6) in QoS element 600 (FIG. 6).

In one example, a bit value of peak data rate present bit 702 may be set to 1, for example, to indicate the presence of peak data rate field 620 (FIG. 6) in QoS element 600 (FIG. 6). In another example, a bit value of peak data rate present bit 702 may be 0, for example, to indicate an absence of peak data rate field 620 (FIG. 6) from QoS element 600 (FIG. 6).

In some demonstrative aspects, as shown in FIG. 7, a mean data rate present bit 704 may be configured to indicate presence or absence of mean data rate field 622 (FIG. 6) in QoS element 600 (FIG. 6).

In one example, a bit value of mean data rate present bit 704 may be set to 1, for example, to indicate a presence of mean data rate field 622 (FIG. 6) in QoS element 600 (FIG. 6). In another example, a bit value of mean data rate present bit 704 may be 0, for example, to indicate an absence of mean data rate field 622 (FIG. 6) from QoS element 600 (FIG. 6).

In some demonstrative aspects, as shown in FIG. 7, a packet delivery ratio present bit 706 may be configured to indicate presence or absence of packet delivery ratio field 624 (FIG. 6) in QoS element 600 (FIG. 6).

In one example, a bit value of packet delivery ratio present bit 706 may be set to 1, for example, to indicate a presence of packet delivery ratio field 624 (FIG. 6) in QoS element 600 (FIG. 6). In another example, a bit value of packet delivery ratio present bit 706 may be 0, for example, to indicate an absence of packet delivery ratio field 624 (FIG. 6) from QoS element 600 (FIG. 6).

In some demonstrative aspects, as shown in FIG. 7, a bandwidth of P2P link present bit 708 may be configured to indicate presence or absence of bandwidth field 626 (FIG. 6) in QoS element 600 (FIG. 6).

In one example, a bit value of bandwidth of P2P link present bit 708 may be set to 1, for example, to indicate a presence of bandwidth field 626 (FIG. 6) in QoS element 600 (FIG. 6). In another example, a bit value of bandwidth of P2P link present bit 708 may be 0, for example, to indicate an absence of bandwidth field 626 (FIG. 6) from QoS element 600 (FIG. 6).

In some demonstrative aspects, as shown in FIG. 7, a medium time present bit 710 may be configured to indicate presence or absence of medium time field 628 (FIG. 6) in QoS element 600 (FIG. 6).

In one example, a bit value of medium time present bit 710 may be set to 1, for example, to indicate a presence of medium time field 628 (FIG. 6) in QoS element 600 (FIG. 6). In another example, a bit value of medium time present bit 710 may be 0, for example, to indicate an absence of medium time field 628 (FIG. 6) from QoS element 600 (FIG. 6).

Referring back to FIG. 1, in some demonstrative aspects, device 102 and/or device 140 may be configured to generate, transmit, receive and/or process a QoS element, e.g., a QEP, configured to include a presence bitmap where one or more bit(s) correspond to presence or absence of a subelement and/or a field carrying optional fields, e.g., as described below.

In one example, an implementation utilizing signaling information to signal presence or absence of a subelement and/or a field carrying optional fields may be conceptually similar to an implementation utilizing signaling information to signal presence or absence of a group of parameters with one bit.

In one example, the subelement may be configured to include its own control field.

Figure 8:
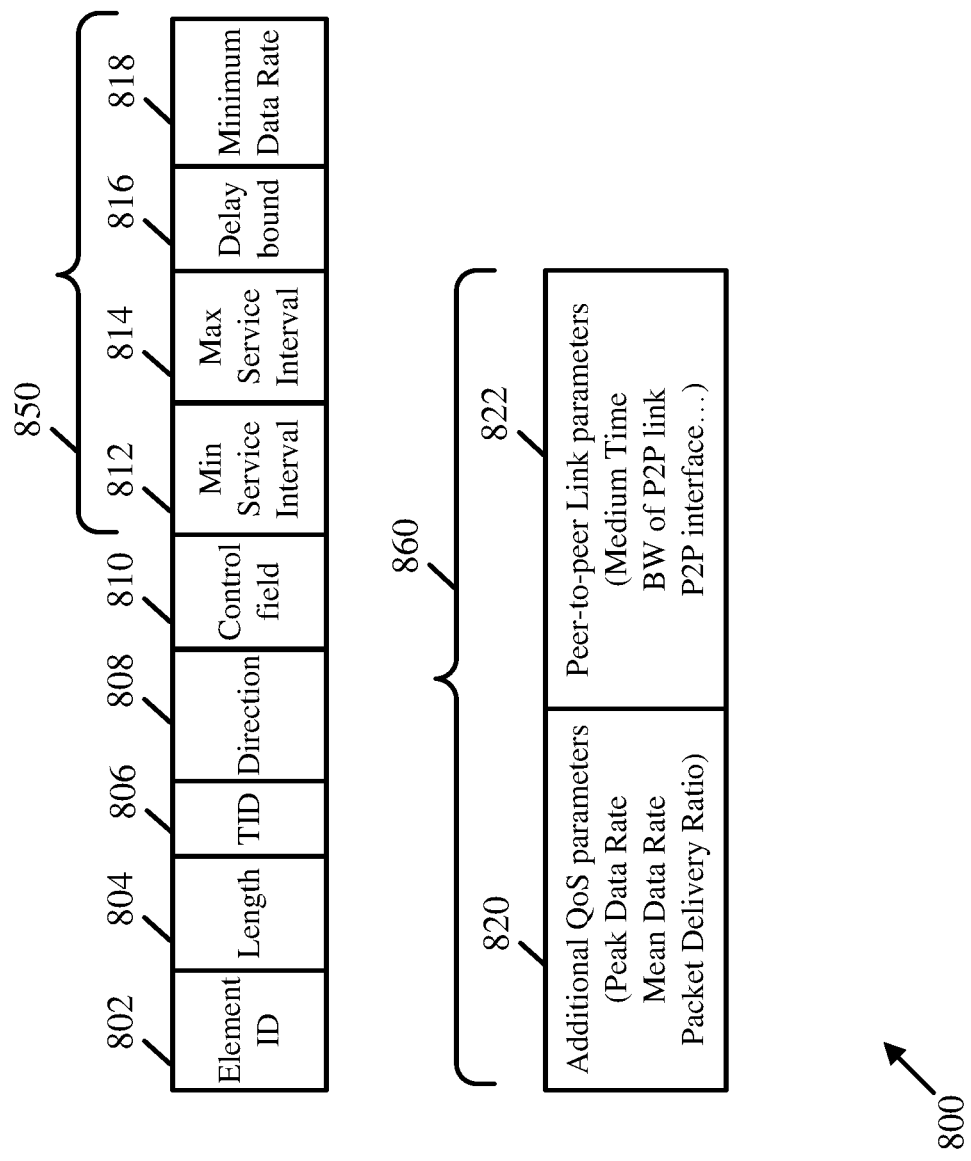
FIG. 8 is a schematic illustration of a QoS element, in accordance with some demonstrative aspects.

Reference is made to FIG. 8, which schematically illustrates a QoS element 800, in accordance with some demonstrative aspects.

In some demonstrative aspects, device 140 (FIG. 1) and/or device 102 may be configured to communicate a frame including QoS element 800. For example, device 140 (FIG. 1) may be configured to transmit to device 102 (FIG. 1) the frame including QoS element 800; and/or device 102 (FIG. 1) may be configured to receive from device 140 (FIG. 1) the frame including QoS element 800.

As shown in FIG. 8, QoS element 800 may include a plurality of parameter fields, e.g., as described below.

In some demonstrative aspects, as shown in FIG. 8, QoS element 800 may include a control field 810 including presence signaling information corresponding to a plurality of parameter fields, e.g., as described below.

In some demonstrative aspects, the presence signaling information may be configured to indicate, for a parameter field of the plurality of parameter fields, whether the parameter field is to be present or absent in QoS element 800, e.g., as described below.

In some demonstrative aspects, QoS element 800 may be configured according to a QoS element format, e.g., as described below.

In some demonstrative aspects, as shown in FIG. 8, QoS element 800 may include a plurality of predefined parameter fields 850. For example, the plurality of predefined parameter fields 850 may be assumed to be present in QoS element 800, e.g., always.

In some demonstrative aspects, as shown in FIG. 8, the plurality of predefined parameter fields 850 may include a minimum service interval field 812. In one example, minimum service interval field 812 may be after control field 810.

In some demonstrative aspects, as shown in FIG. 8, the plurality of predefined parameter fields 850 may include a maximum service interval field 814. In one example, maximum service interval field 814 may be after minimum service interval field 812. In another example, maximum service interval field 814 may be located in any other alternative location in QoS element 800.

In some demonstrative aspects, as shown in FIG. 8, the plurality of predefined parameter fields 850 may include a delay bound field 816. In one example, delay bound field 816 may be after maximum service interval field 814. In another example, delay bound field 816 may be located in any other alternative location in QoS element 800.

In some demonstrative aspects, as shown in FIG. 8, the plurality of predefined parameter fields 850 may include a minimum data rate field 818. In one example, minimum data rate field 818 may be after delay bound field 816. In another example, minimum data rate field 818 may be located in any other alternative location in QoS element 800.

In some demonstrative aspects, the plurality of predefined parameter fields 850 may include one or more of, e.g., some or all of, the fields 812, 814, 816, and/or 818. In other aspects, the plurality of predefined parameter fields 850 may include any other additional or alternative parameter fields.

In some demonstrative aspects, QoS element 800 may include a plurality of parameter fields after the plurality of predefined parameter fields 850, e.g., as described below.

In some demonstrative aspects, as shown in FIG. 8, QoS element 800 may include a plurality of additional parameter fields 860. In one example, the plurality of additional parameter fields 860 may be after the plurality of predefined parameter fields 850. In another example, the plurality of additional parameter fields 860 may be located in any other alternative location in QoS element 800.

In some demonstrative aspects, as shown in FIG. 8, the plurality of additional parameter fields 860 may include one or more fields including groups of fields. For example, the plurality of additional parameter fields 860 may include one or more subelements and/or fields carrying optional fields.

In some demonstrative aspects, as shown in FIG. 8, the plurality of additional parameter fields 860 may include an additional QoS parameters subelement 820.

In some demonstrative aspects, as shown in FIG. 8, additional QoS parameters subelement 820 may include one or more fields, e.g., a peak data rate field, a mean data rate field, a packet delivery ratio field, and/or any other additional or alternative field.

In one example, additional QoS parameters subelement 820 may be after minimum data rate field 818. In another example, additional QoS parameters field 820 may be located in any other alternative location in QoS element 800.

In some demonstrative aspects, as shown in FIG. 8, the plurality of additional parameter fields 860 may include a peer-to-peer link parameters subelement 822.

In some demonstrative aspects, as shown in FIG. 8, peer-to-peer link parameters subelement 822 may include one or more fields, e.g., a medium time field, a BW of P2P link field, a P2P interface field, and/or any other additional or alternative field.

In one example, peer-to-peer link parameters subelement 822 may be after additional QoS parameters field 820. In another example, peer-to-peer link parameters subelement 822 may be located in any other alternative location in QoS element 800.

In some demonstrative aspects, the plurality of additional parameter fields 860 may include one or more of, e.g., some or all of, the subelements 820 and/or 822. In other aspects, the plurality of additional parameter fields 860 may include any other additional or alternative subelement and/or field carrying optional fields.

In some demonstrative aspects, as shown in FIG. 8, QoS element 800 may include one or more fields before the control field 810, e.g., as described below.

In some demonstrative aspects, as shown in FIG. 8, QoS element 800 may include an element ID field 802, a length field 804, a TID field 806, and/or a direction field 808.

In some demonstrative aspects, control field 810 may be after the element ID field 802, the length field 804, the TID field 806, and/or the direction field 808.

In some demonstrative aspects, one or more of, e.g., some or all of, the subelements 820 and/or 822 may be selectively present in or absent from the QoS element 800.

In some demonstrative aspects, presence or absence of one or more of, e.g., some or all of, the subelements 820 and/or 822 in the QoS element 800 may be configured according to the presence signaling information in the control field 810.

In some demonstrative aspects, control field 810 may include a presence bitmap to indicate the presence signaling information corresponding to the subelements 820 and/or 822, e.g., as described below.

Figure 9:
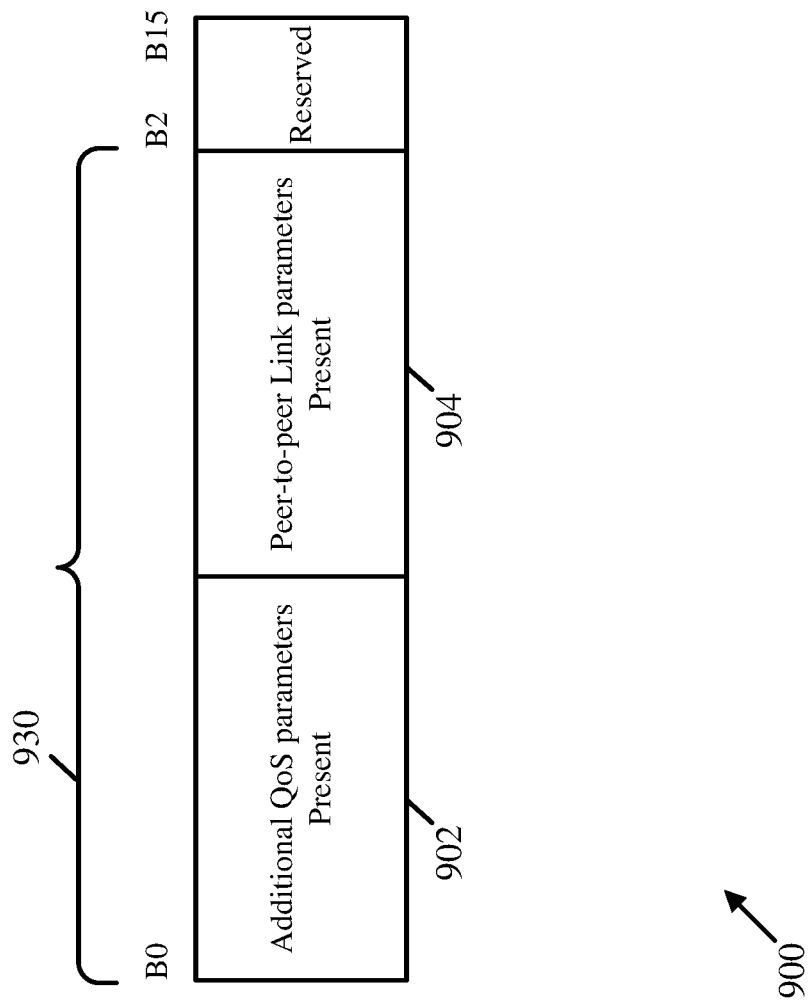
FIG. 9 is a schematic illustration of a control field, in accordance with some demonstrative aspects.

Reference is made to FIG. 9, which schematically illustrates a control field 900, in accordance with some demonstrative aspects. For example, control field 810 (FIG. 8) may include one or more elements of control field 900.

In some demonstrative aspects, device 140 (FIG. 1) and/or device 102 may be configured to communicate QoS element 800 (FIG. 8) including control field 900. For example, device 140 (FIG. 1) may be configured to transmit to device 102 (FIG. 1) a QoS element, e.g., QoS element 800 (FIG. 8), including control field 900; and/or device 102 (FIG. 1) may be configured to receive from device 140 (FIG. 1) a QoS element, e.g., QoS element 800 (FIG. 8), including control field 900.

In some demonstrative aspects, control field 800 may include a presence bitmap, e.g., as described below.

In some demonstrative aspects, the presence bitmap may be configured to signal presence or absence of certain parameter fields, e.g., as described below.

In one example, the presence bitmap may be configured to exclude signaling presence or absence of parameter fields which are, e.g., mandatorily, present. For example, the presence bitmap may be configured to exclude signaling presence or absence of one or more predefined mandatory parameter fields.

In some demonstrative aspects, the presence bitmap may be configured to signal presence or absence of a plurality of additional parameter fields of a QoS element, e.g., as described below.

In some demonstrative aspects, the presence bitmap may be configured to signal presence or absence of one or more subelements and/or fields carrying optional fields, e.g., as described below.

In some demonstrative aspects, the presence bitmap may include a plurality of bits 930 corresponding to a plurality of additional parameter fields of a QoS element, respectively. For example, the plurality of bits 930 may correspond to the plurality of additional parameter fields of QoS element 800 (FIG. 8), e.g., the plurality of additional parameter fields 860 (FIG. 8). For example, the plurality of bits 930 may include a plurality of bits corresponding to the subelements, 820 and/or 822, respectively.

In some demonstrative aspects, a value of a bit in the presence bitmap corresponding to a parameter subelement field of the plurality of parameter subelement fields of a QoS elements, e.g., QoS element 800 (FIG. 8), may indicate whether the parameter subelement field is to be present or absent, e.g., as described below.

In some demonstrative aspects, a bit value set to 1 in the presence bitmap may correspond to a parameter field, subelement, and/or field carrying optional fields to be present in QoS element 800 (FIG. 8), e.g., as described below. For example, QoS element 800 (FIG. 8) may be configured to include the parameter field, subelement, and/or field carrying optional fields, which is indicated by the presence bitmap to be present in the QoS element 800 (FIG. 8).

In some demonstrative aspects, a bit value of 0 in the presence bitmap may correspond to a parameter subelement field which is absent from QoS element 800 (FIG. 8).

In some demonstrative aspects, as shown in FIG. 9, an additional QoS parameters present bit 902 may be configured to indicate presence or absence of additional QoS parameters subelement 820 (FIG. 8).

In one example, a bit value of additional QoS parameters present bit 902 may be set to 1, for example, to indicate the presence of additional QoS parameters subelement 820 (FIG. 8) in QoS element 800 (FIG. 8). In another example, a bit value of additional QoS parameters present bit 902 may be 0, for example, to indicate an absence of additional QoS parameters subelement 820 (FIG. 8) from QoS element 800 (FIG. 8).

In some demonstrative aspects, as shown in FIG. 9, a peer-to-peer link parameters present bit 904, may be configured to indicate presence or absence of peer-to-peer link parameters subelement 822 (FIG. 8).

In one example, a bit value of peer-to-peer link parameters present bit 904 may be set to 1, for example, to indicate the presence of peer-to-peer link parameters subelement 822 (FIG. 8) in QoS element 800 (FIG. 8). In another example, a bit value of peer-to-peer link parameters present bit 904 may be 0, for example, to indicate an absence of peer-to-peer link parameters subelement 822 (FIG. 8) from QoS element 800 (FIG. 8).

Referring back to FIG. 1, in some demonstrative aspects, device 102 and/or device 140 may be configured to generate, transmit, receive and/or process a control field, which may be included in a subelement in a QoS element, e.g., a QEP, e.g., as described below.

In some demonstrative aspects, the control field may not be configured as a field in the QoS element, e.g., the QPE. For example, the control field may be present in an included subelement of the QoS element, for example, as part of an additional QoS parameters subelement, as described below.

In some demonstrative aspects, the control field in the included subelement may be configured to signal the presence and/or absence of parameter fields in the additional QoS parameters subelement, e.g., as described below.

Figure 10:
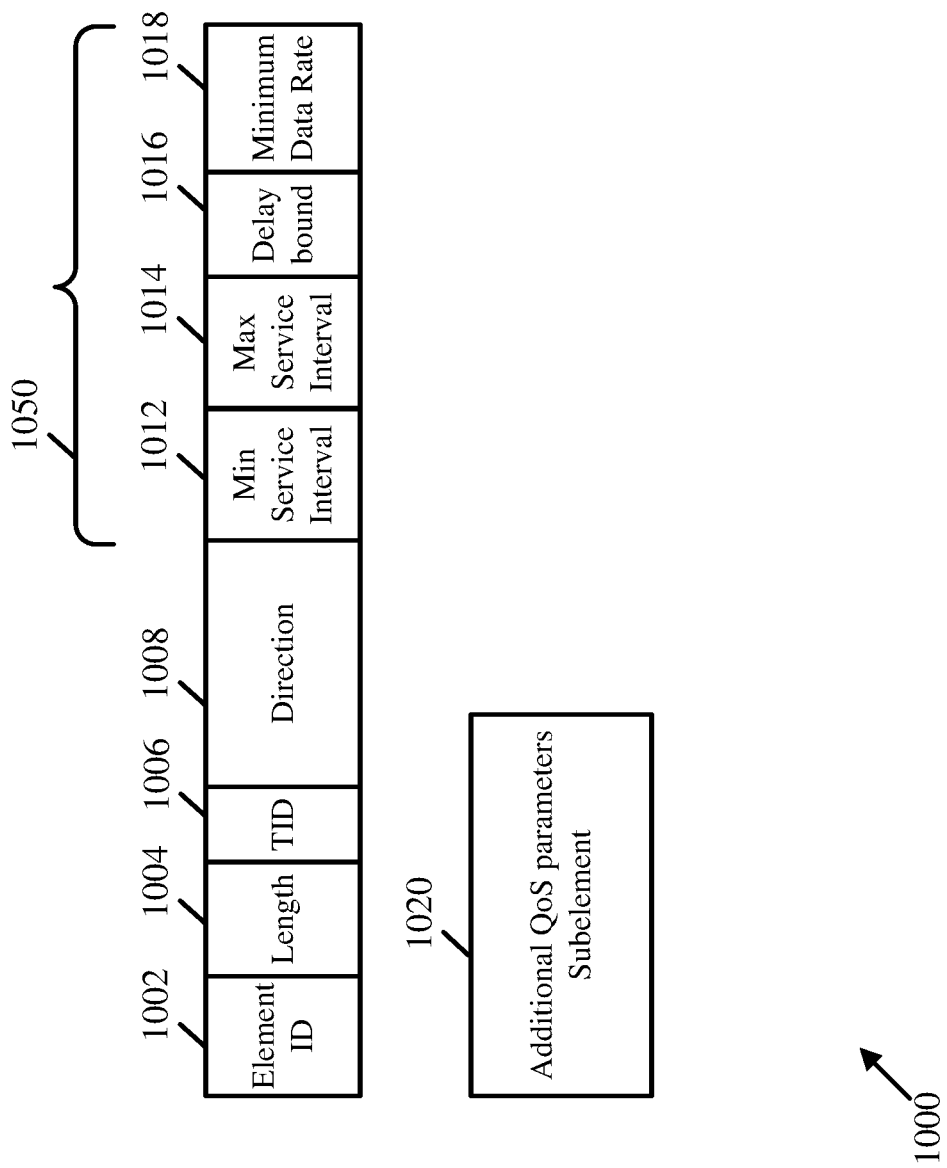
FIG. 10 is a schematic illustration of a QoS element, in accordance with some demonstrative aspects.

Reference is made to FIG. 10, which schematically illustrates a QoS element 1000, in accordance with some demonstrative aspects.

In some demonstrative aspects, device 140 (FIG. 1) and/or device 102 may be configured to communicate a frame including QoS element 1000. For example, device 140 (FIG. 1) may be configured to transmit to device 102 (FIG. 1) the frame including QoS element 1000; and/or device 102 (FIG. 1) may be configured to receive from device 140 (FIG. 1) the frame including QoS element 1000.

As shown in FIG. 10, QoS element 1000 may include a plurality of parameter fields, e.g., as described below.

In some demonstrative aspects, QoS element 1000 may be configured according to a QoS element format, e.g., as described below.

In some demonstrative aspects, as shown in FIG. 10, QoS element 1000 may include a plurality of predefined parameter fields 1050. For example, the plurality of predefined parameter fields 1050 may be assumed to be present in QoS element 1000, e.g., always.

In some demonstrative aspects, as shown in FIG. 10, the plurality of predefined parameter fields 1050 may include a minimum service interval field 1012.

In some demonstrative aspects, as shown in FIG. 10, the plurality of predefined parameter fields 1050 may include a maximum service interval field 1014. In one example, maximum service interval field 1014 may be after minimum service interval field 1012. In another example, maximum service interval field 1014 may be located in any other alternative location in QoS element 1000.

In some demonstrative aspects, as shown in FIG. 10, the plurality of predefined parameter fields 1050 may include a delay bound field 1016. In one example, delay bound field 1016 may be after maximum service interval field 1014. In another example, delay bound field 1016 may be located in any other alternative location in QoS element 1000.

In some demonstrative aspects, as shown in FIG. 10, the plurality of predefined parameter fields 1050 may include a minimum data rate field 1018. In one example, minimum data rate field 1018 may be after delay bound field 1016. In another example, minimum data rate field 1018 may be located in any other alternative location in QoS element 1000.

In some demonstrative aspects, the plurality of predefined parameter fields 1050 may include one or more of, e.g., some or all of, the fields 1012, 1014, 1016, and/or 1018. In other aspects, the plurality of predefined parameter fields 1050 may include any other additional or alternative parameter fields.

In some demonstrative aspects, as shown in FIG. 10, QoS element 1000 may include one or more fields before the plurality of predefined parameter fields 1050, e.g., as described below.

In some demonstrative aspects, as shown in FIG. 10, QoS element 1000 may include an element ID field 1002, a length field 1004, a TID field 1006, and/or a direction field 1008.

In some demonstrative aspects, plurality of predefined parameter fields 1050 may be after the element ID field 1002, the length field 1004, the TID field 1006, and/or the direction field 1008.

In some demonstrative aspects, QoS element 1000 may include one or more parameter fields, subelements, and/or fields carrying optional fields, e.g., after the plurality of predefined parameter fields 1050, e.g., as described below.

In some demonstrative aspects, as shown in FIG. 10, QoS element 1000 may include an additional QoS parameters subelement 1020. In one example, additional QoS parameters subelement 1020 may be after minimum data rate field 1018. In another example, additional QoS parameters subelement 1020 may be located in any other alternative location in QoS element 1000.

In some demonstrative aspects, additional QoS parameters subelement 1020 may include a control field configured to signal the presence and/or absence of parameter fields in additional QoS parameters subelement 1020, e.g., as described below.

Figure 11:
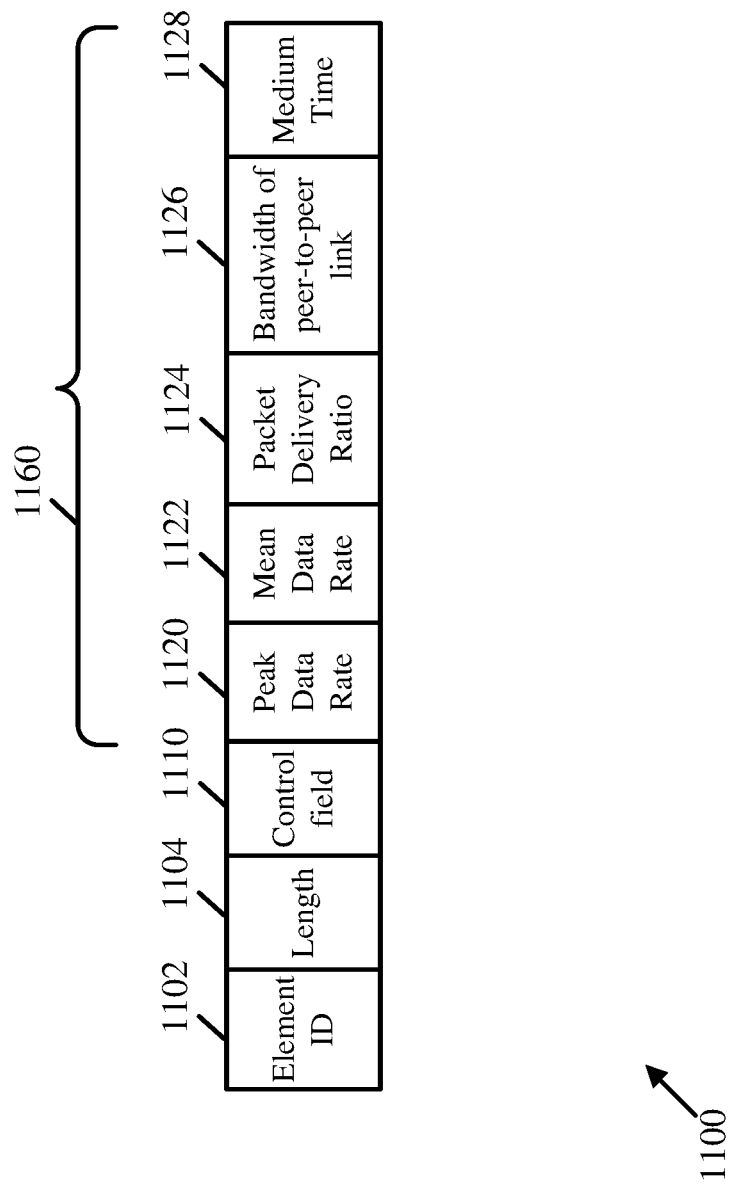
FIG. 11 is a schematic illustration of a QoS subelement, in accordance with some demonstrative aspects.

Reference is made to FIG. 11, which schematically illustrates a QoS subelement 1100, in accordance with some demonstrative aspects. For example, additional QoS parameters subelement 1020 (FIG. 10) may include QoS subelement 1100.

In some demonstrative aspects, device 140 (FIG. 1) and/or device 102 may be configured to communicate a frame including QoS element 1000 (FIG. 10) including QoS subelement 1100. For example, device 140 (FIG. 1) may be configured to transmit to device 102 (FIG. 1) the frame including QoS subelement 1100; and/or device 102 (FIG. 1) may be configured to receive from device 140 (FIG. 1) the frame including QoS subelement 1100.

As shown in FIG. 11, QoS subelement 1100 may include a plurality of fields, e.g., as described below.

In some demonstrative aspects, as shown in FIG. 11, QoS subelement 1100 may include a control field 1110 including presence signaling information corresponding to a plurality of parameter fields 1160, e.g., as described below. For example, the plurality of parameter fields 1160 may be after control field 1110.

In some demonstrative aspects, the presence signaling information may be configured to indicate, for a parameter field of the plurality of parameter fields 1160, whether the parameter field is to be present or absent in QoS subelement 1100, e.g., as described below.

In some demonstrative aspects, as shown in FIG. 11, QoS subelement 1100 may include a peak data rate field 1120.

In some demonstrative aspects, as shown in FIG. 11, QoS subelement 1100 may include a mean data rate field 1122. In one example, mean data rate field 1122 may be after peak data rate field 1120. In another example, mean data rate field 1122 may be located in any other alternative location in QoS subelement 1100.

In some demonstrative aspects, as shown in FIG. 11, QoS subelement 1100 may include a packet delivery ratio field 1124. In one example, packet delivery ratio field 1124 may be after mean data rate field 1122. In another example, packet delivery ratio field 1124 may be located in any other alternative location in QoS subelement 1100.

In some demonstrative aspects, as shown in FIG. 11, QoS subelement 1100 may include a bandwidth field 1126. For example, bandwidth field 1126 may be configured to indicate a bandwidth of a link. In one example, as shown in FIG. 11, bandwidth field 1126 may include a peer-to-peer bandwidth field to indicate a bandwidth of a peer-to-peer link. In other aspects, bandwidth field 1126 may be configured to indicate any other bandwidth of any other link. In one example, bandwidth link field 1126 may be after packet delivery ratio field 1124. In another example, bandwidth link field 1126 may be located in any other alternative location in QoS subelement 1100.

In some demonstrative aspects, as shown in FIG. 11, QoS subelement 1100 may include a medium time field 1128. In one example, medium time field 1128 may be after bandwidth link field 1126. In another example, medium time field 1128 may be located in any other alternative location in QoS subelement 1100.

In some demonstrative aspects, one or more of, e.g., some or all of, the parameter fields 1120, 1122, 1124, 1126 and/or 1128 may be selectively present in or absent from the QoS subelement 1100.

In some demonstrative aspects, presence or absence of one or more of, e.g., some or all of, the parameter fields 1120, 1122, 1124, 1126 and/or 1128 in the QoS subelement 1100 may be configured according to the presence signaling information in the control field 1110.

In some demonstrative aspects, the plurality of parameter fields 1160 may include one or more of, e.g., some or all of, the fields 1120, 1122, 1124, 1126, and/or 1128. In other aspects, the plurality of parameter fields 1160 may include any other additional or alternative parameter fields.

In some demonstrative aspects, as shown in FIG. 11, QoS subelement 1100 may include one or more fields before the control field 1110, e.g., as described below.

In some demonstrative aspects, as shown in FIG. 11, QoS subelement 1100 may include an element ID field 1102 and/or a length field 1104.

In some demonstrative aspects, control field 1110 may be after the element ID field 1102 and/or the length field 1104.

Figure 12:
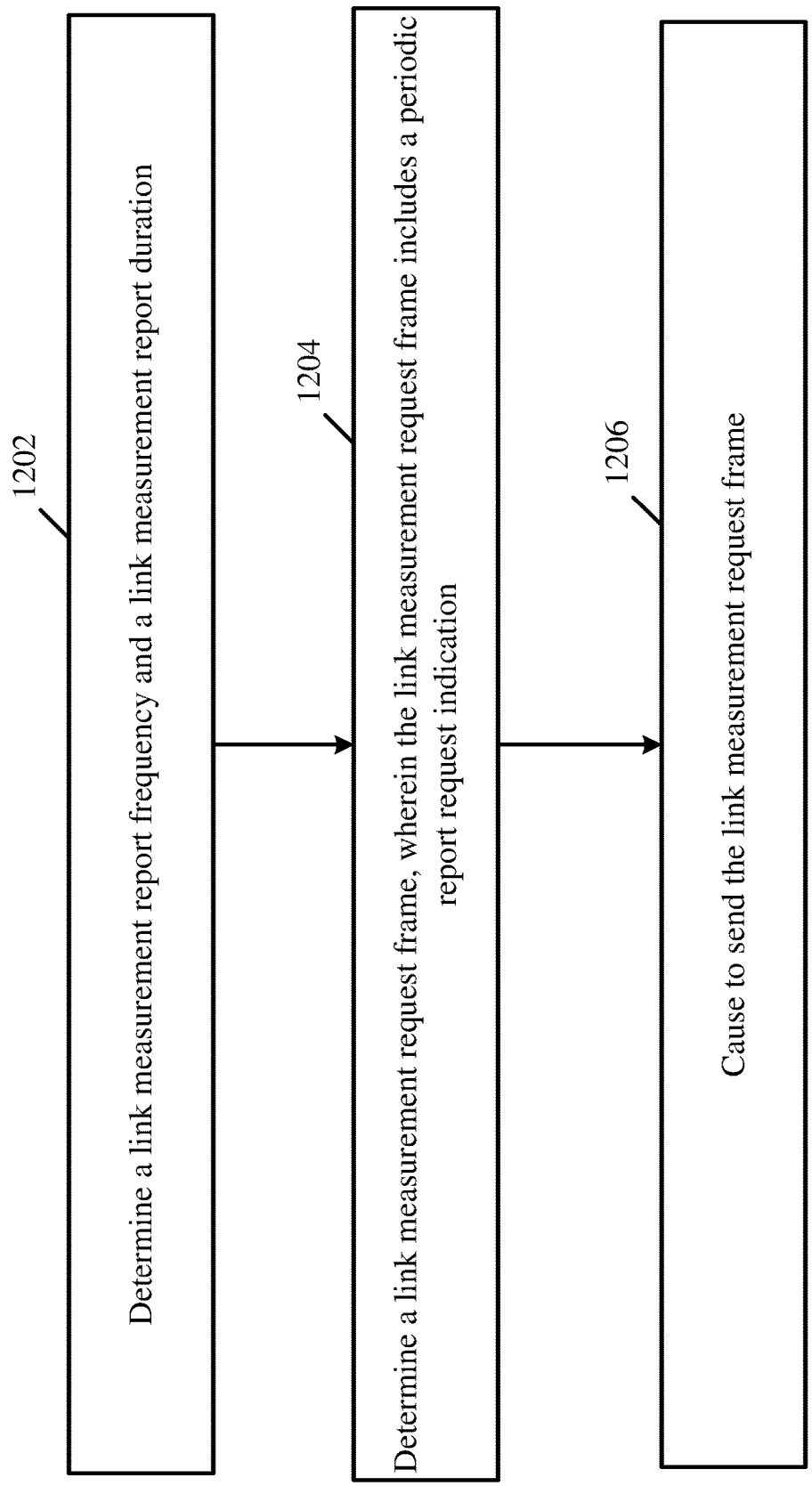
FIG. 12 is a schematic flow-chart illustration of a method of QoS parameter signaling, in accordance with some demonstrative aspects.

Reference is made to FIG. 12, which schematically illustrates a method of QoS parameter signaling, in accordance with some demonstrative aspects. For example, one or more of the operations of the method of FIG. 12 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1202, the method may include determining, at an EHT STA, a link measurement report frequency and a link measurement report duration. For example, controller 154 (FIG. 1) may be configured to cause, trigger, and/or control device 140 (FIG. 1) to determine the link measurement report frequency and the link measurement report duration, e.g., as described above.

As indicated at block 1204, the method may include determining a link measurement request frame, wherein the link measurement request frame includes a periodic report request indication. For example, controller 154 (FIG. 1) may be configured to cause, trigger, and/or control device 140 (FIG. 1) to determine the link measurement request frame, wherein the link measurement request frame includes the periodic report request indication, e.g., as described above.

As indicated at block 1206, the method may include causing the EHT STA to send the link measurement request frame. For example, controller 154 (FIG. 1) may be configured to cause, trigger, and/or control device 140 (FIG. 1) to send the link measurement request frame, e.g., as described above.

Figure 13:
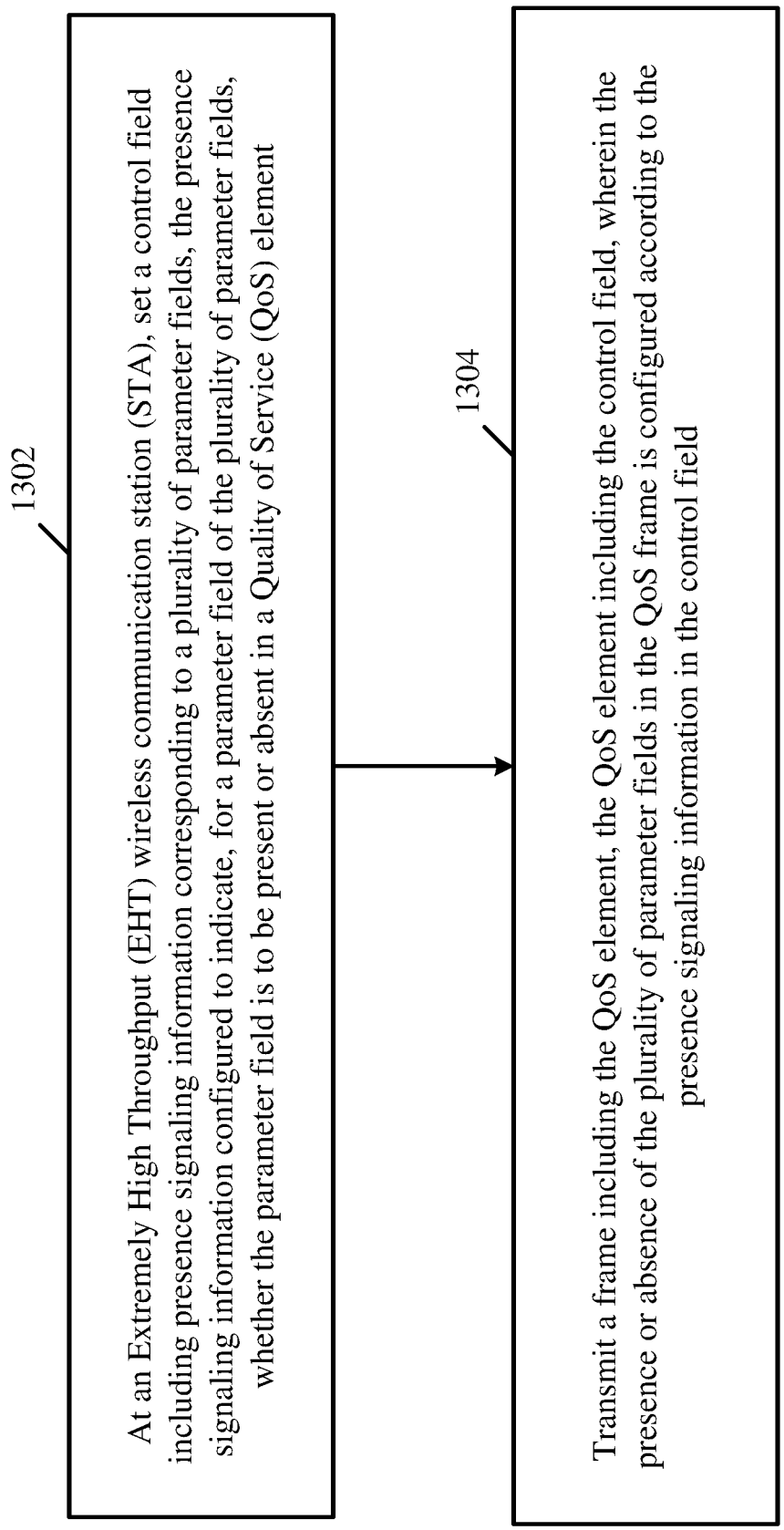
FIG. 13 is a schematic flow-chart illustration of a method of communicating a QoS element, in accordance with some demonstrative aspects.

Reference is made to FIG. 13, which schematically illustrates a method of communicating a QoS element, in accordance with some demonstrative aspects. For example, one or more of the operations of the method of FIG. 13 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1302, the method may include setting, at an EHT STA, a control field including presence signaling information corresponding to a plurality of parameter fields, the presence signaling information configured to indicate, for a parameter field of the plurality of parameter fields, whether the parameter field is to be present or absent in a QoS element. For example, controller 154 (FIG. 1) may be configured to cause, trigger, and/or control device 140 (FIG. 1) to set the control field including presence signaling information corresponding to the plurality of parameter fields, e.g., as described above.

As indicated at block 1304, the method may include transmitting a frame including the QoS element, the QoS element including the control field, wherein the presence or absence of the plurality of parameter fields in the QoS element is configured according to the presence signaling information in the control field. For example, controller 154 (FIG. 1) may be configured to cause, trigger, and/or control device 140 (FIG. 1) to transmit the frame including the QoS element, the QoS element including the control field, e.g., as described above.

Figure 14:
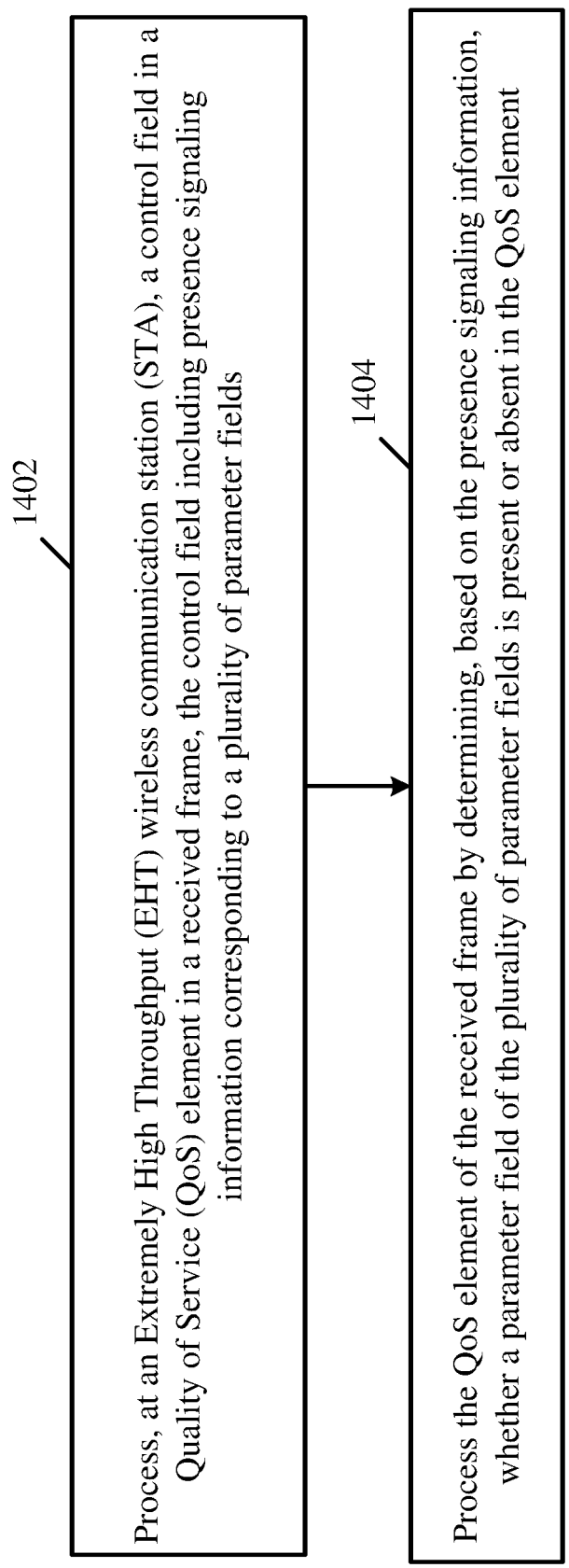
FIG. 14 is a schematic flow-chart illustration of a method of communicating a QoS element, in accordance with some demonstrative aspects.

Reference is made to FIG. 14, which schematically illustrates a method of communicating a QoS element, in accordance with some demonstrative aspects. For example, one or more of the operations of the method of FIG. 14 may be performed by one or more elements of a system, e.g., system 100 (FIG. 1), for example, one or more wireless devices, e.g., device 102 (FIG. 1), and/or device 140 (FIG. 1), an MLD, e.g., MLD 131 (FIG. 1) and/or MLD 151 (FIG. 1), a controller, e.g., controller 124 (FIG. 1) and/or controller 154 (FIG. 1), a radio, e.g., radio 114 (FIG. 1) and/or radio 144 (FIG. 1), and/or a message processor, e.g., message processor 128 (FIG. 1) and/or message processor 158 (FIG. 1).

As indicated at block 1402, the method may include processing, at an EHT STA, a control field in a QoS element in a received frame, the control field including presence signaling information corresponding to a plurality of parameter fields. For example, controller 124 (FIG. 1) may be configured to cause, trigger, and/or control device 102 (FIG. 1) to process the control field in the QoS element in the received frame, e.g., as described above.

As indicated at block 1404, the method may include processing the QoS element of the received frame by determining, based on the presence signaling information, whether a parameter field of the plurality of parameter fields is present or absent in the QoS element. For example, controller 124 (FIG. 1) may be configured to cause, trigger, and/or control device 102 (FIG. 1) to process the QoS element of the received frame by determining, based on the presence signaling information, whether a parameter field of the plurality of parameter fields is present or absent in the QoS element, e.g., as described above.

Figure 15:
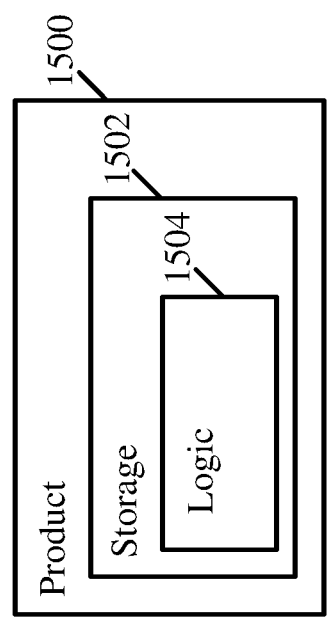
FIG. 15 is a schematic illustration of a product of manufacture, in accordance with some demonstrative aspects.

Reference is made to FIG. 15, which schematically illustrates a product of manufacture 1500, in accordance with some demonstrative aspects. Product 1500 may include one or more tangible computer-readable ("machine-readable") non-transitory storage media 1502, which may include computer-executable instructions, e.g., implemented by logic 1504, operable to, when executed by at least one computer processor, enable the at least one computer processor to implement one or more operations at device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to cause device 102 (FIG. 1), device 140 (FIG. 1), MLD 131 (FIG. 1), MLD 151 (FIG. 1), radio 114 (FIG. 1), radio 144 (FIG. 1), transmitter 118 (FIG. 1), transmitter 148 (FIG. 1), receiver 116 (FIG. 1), receiver 146 (FIG. 1), message processor 128 (FIG. 1), message processor 158 (FIG. 1), controller 124 (FIG. 1), and/or controller 154 (FIG. 1), to perform, trigger and/or implement one or more operations and/or functionalities, and/or to perform, trigger and/or implement one or more operations and/or functionalities described with reference to the FIGS. 1, 2, 3, 4, 5, 6, 7, 8, 9, 10, 11, 12, 13, and/or 14, and/or one or more operations described herein. The phrases "non-transitory machine-readable medium" and "computer-readable non-transitory storage media" may be directed to include all machine and/or computer readable media, with the sole exception being a transitory propagating signal.

In some demonstrative aspects, product 1500 and/or machine readable storage media 1502 may include one or more types of computer-readable storage media capable of storing data, including volatile memory, non-volatile memory, removable or non-removable memory, erasable or non-erasable memory, writeable or re-writeable memory, and the like. For example, machine readable storage media 1502 may include, RAM, DRAM, Double-Data-Rate DRAM (DDR-DRAM), SDRAM, static RAM (SRAM), ROM, programmable ROM (PROM), erasable programmable ROM (EPROM), electrically erasable programmable ROM (EEPROM), Compact Disk ROM (CD-ROM), Compact Disk Recordable (CD-R), Compact Disk Rewriteable (CD-RW), flash memory (e.g., NOR or NAND flash memory), content addressable memory (CAM), polymer memory, phase-change memory, ferroelectric memory, silicon-oxide-nitride-oxide-silicon (SONOS) memory, a disk, a floppy disk, a hard drive, an optical disk, a magnetic disk, a card, a magnetic card, an optical card, a tape, a cassette, and the like. The computer-readable storage media may include any suitable media involved with downloading or transferring a computer program from a remote computer to a requesting computer carried by data signals embodied in a carrier wave or other propagation medium through a communication link, e.g., a modem, radio or network connection.

In some demonstrative aspects, logic 1504 may include instructions, data, and/or code, which, if executed by a machine, may cause the machine to perform a method, process and/or operations as described herein. The machine may include, for example, any suitable processing platform, computing platform, computing device, processing device, computing system, processing system, computer, processor, or the like, and may be implemented using any suitable combination of hardware, software, firmware, and the like.

In some demonstrative aspects, logic 1504 may include, or may be implemented as, software, a software module, an application, a program, a subroutine, instructions, an instruction set, computing code, words, values, symbols, and the like. The instructions may include any suitable type of code, such as source code, compiled code, interpreted code, executable code, static code, dynamic code, and the like. The instructions may be implemented according to a predefined computer language, manner or syntax, for instructing a processor to perform a certain function. The instructions may be implemented using any suitable high-level, low-level, object-oriented, visual, compiled and/or interpreted programming language, such as C, C++, Java, BASIC, Matlab, Pascal, Visual BASIC, assembly language, machine code, and the like.

EXAMPLES

The following examples pertain to further aspects.

Example 1 includes apparatus comprising logic and circuitry configured to cause an Extremely High Throughput (EHT) wireless communication station (STA) to set a control field comprising presence signaling information corresponding to a plurality of parameter fields, the presence signaling information configured to indicate, for a parameter field of the plurality of parameter fields, whether the parameter field is to be present or absent in a Quality of Service (QoS) element; and transmit a frame comprising the QoS element, the QoS element comprising the control field, wherein the presence or absence of the plurality of parameter fields in the QoS element is configured according to the presence signaling information in the control field.

Example 2 includes the subject matter of Example 1, and optionally, wherein the control field comprises a presence bitmap comprising a plurality of bits corresponding to the plurality of parameter fields, respectively, a value of a bit in the presence bitmap corresponding to the parameter field is to indicate whether the parameter field is to be present or absent in the QoS element.

Example 3 includes the subject matter of Example 2, and optionally, wherein the apparatus is configured to cause the EHT STA to set to 1 a bit in the presence bitmap corresponding to a parameter field to be present in the QoS element, and to configure the QoS element to include the parameter field to be present in the QoS element.

Example 4 includes the subject matter of Example 2 or 3, and optionally, wherein a bit in the presence bitmap corresponding to a parameter field which is absent from the QoS element is 0.

Example 5 includes the subject matter of any one of Examples 1-4, and optionally, wherein the plurality of parameter fields comprises a maximum Medium Access Control (MAC) Service Data Unit (MSDU) size field.

Example 6 includes the subject matter of any one of Examples 1-5, and optionally, wherein the plurality of parameter fields comprises a mean data rate field.

Example 7 includes the subject matter of any one of Examples 1-6, and optionally, wherein the plurality of parameter fields comprises a delivery ratio field.

Example 8 includes the subject matter of any one of Examples 1-7, and optionally, wherein the plurality of parameter fields comprises a medium time field.

Example 9 includes the subject matter of any one of Examples 1-8, and optionally, wherein the plurality of parameter fields comprises a bandwidth field to indicate a bandwidth of a link.

Example 10 includes the subject matter of any one of Examples 1-9, and optionally, wherein the plurality of parameter fields comprises a size field.

Example 11 includes the subject matter of any one of Examples 1-10, and optionally, wherein the plurality of parameter fields comprises a time field.

Example 12 includes the subject matter of any one of Examples 1-11, and optionally, wherein the QoS element comprises a plurality of predefined parameter fields.

Example 13 includes the subject matter of Example 12, and optionally, wherein the presence signaling information corresponds to a plurality of additional parameter fields different from the plurality of predefined parameter fields.

Example 14 includes the subject matter of Example 12 or 13, and optionally, wherein the QoS element is configured according to a QoS element format, the QoS element format comprising the plurality of predefined parameter fields after the control field, and the plurality of parameter fields after the plurality of predefined parameter fields.

Example 15 includes the subject matter of any one of Examples 12-14, and optionally, wherein the plurality of predefined parameter fields comprises a minimum service interval field.

Example 16 includes the subject matter of any one of Examples 12-15, and optionally, wherein the plurality of predefined parameter fields comprises a maximum service interval field.

Example 17 includes the subject matter of any one of Examples 12-16, and optionally, wherein the plurality of predefined parameter fields comprises a minimum data rate field.

Example 18 includes the subject matter of any one of Examples 12-17, and optionally, wherein the plurality of predefined parameter fields comprises a delay bound field.

Example 19 includes the subject matter of any one of Examples 1-18, and optionally, wherein the QoS element comprises a Traffic Identifier (TID) field and a direction field, wherein the presence signaling information is after the TID field and the direction field.

Example 20 includes the subject matter of any one of Examples 1-19, and optionally, wherein the plurality of parameter fields comprise stream-specific parameter fields.

Example 21 includes the subject matter of any one of Examples 1-20, and optionally, wherein the frame comprises a Stream Classification Service (SCS) request frame of an SCS procedure.

Example 22 includes the subject matter of Example 21, and optionally, wherein the EHT STA comprises an EHT STA of a first Multi-Link Device (MLD), wherein the SCS procedure comprises an SCS procedure between the first MLD and a second MLD.

Example 23 includes the subject matter of any one of Examples 1-22, and optionally, wherein the EHT STA comprises a non Access Point (AP) (non-AP) EHT STA, wherein the frame comprises a frame to an EHT AP.

Example 24 includes the subject matter of any one of Examples 1-23, and optionally, comprising at least one radio to transmit the frame.

Example 25 includes the subject matter of Example 24, and optionally, comprising one or more antennas connected to the radio, and a processor to execute instructions of an operating system of the EHT STA.

Example 26 includes an apparatus comprising logic and circuitry configured to cause an Extremely High Throughput (EHT) wireless communication station (STA) to process a control field in a Quality of Service (QoS) element in a received frame, the control field comprising presence signaling information corresponding to a plurality of parameter fields; and process the QoS element of the received frame by determining, based on the presence signaling information, whether a parameter field of the plurality of parameter fields is present or absent in the QoS element.

Example 27 includes the subject matter of Example 26, and optionally, wherein the control field comprises a presence bitmap comprising a plurality of bits corresponding to the plurality of parameter fields, respectively, a value of a bit in the bitmap parameter field corresponding to the parameter field is to indicate whether the parameter field is present or absent in the QoS element.

Example 28 includes the subject matter of Example 27, and optionally, wherein the apparatus is configured to cause the EHT STA to determine based on a bit having a bit value of 1 in the presence bitmap that a parameter field corresponding to the bit having the bit value of 1 is present in the QoS element.

Example 29 includes the subject matter of Example 27 or 28, and optionally, wherein the apparatus is configured to cause the EHT STA to determine based on a bit having a bit value of 0 in the presence bitmap that a parameter field corresponding to the bit having the bit value of 0 is absent from the QoS element.

Example 30 includes the subject matter of any one of Examples 26-29, and optionally, wherein the plurality of parameter fields comprises a maximum Medium Access Control (MAC) Service Data Unit (MSDU) size field.

Example 31 includes the subject matter of any one of Examples 26-30, and optionally, wherein the plurality of parameter fields comprises a mean data rate field.

Example 32 includes the subject matter of any one of Examples 26-31, and optionally, wherein the plurality of parameter fields comprises a delivery ratio field.

Example 33 includes the subject matter of any one of Examples 26-32, and optionally, wherein the plurality of parameter fields comprises a medium time field.

Example 34 includes the subject matter of any one of Examples 26-33, and optionally, wherein the plurality of parameter fields comprises a bandwidth field to indicate a bandwidth of a link.

Example 35 includes the subject matter of any one of Examples 26-34, and optionally, wherein the plurality of parameter fields comprises a size field.

Example 36 includes the subject matter of any one of Examples 26-35, and optionally, wherein the plurality of parameter fields comprises a time field.

Example 37 includes the subject matter of any one of Examples 26-36, and optionally, wherein the QoS element comprises a plurality of predefined parameter fields.

Example 38 includes the subject matter of Example 37, and optionally, wherein the presence signaling information corresponds to a plurality of additional parameter fields different from the plurality of predefined parameter fields.

Example 39 includes the subject matter of Example 37 or 38, and optionally, wherein the QoS element is configured according to a QoS element format, the QoS element format comprising the plurality of predefined parameter fields after the control field, and the plurality of parameter fields after the plurality of predefined parameter fields.

Example 40 includes the subject matter of any one of Examples 37-39, and optionally, wherein the plurality of predefined parameter fields comprises a minimum service interval field.

Example 41 includes the subject matter of any one of Examples 37-40, and optionally, wherein the plurality of predefined parameter fields comprises a maximum service interval field.

Example 42 includes the subject matter of any one of Examples 37-41, and optionally, wherein the plurality of predefined parameter fields comprises a minimum data rate field.

Example 43 includes the subject matter of any one of Examples 37-42, and optionally, wherein the plurality of predefined parameter fields comprises a delay bound field.

Example 44 includes the subject matter of any one of Examples 26-43, and optionally, wherein the QoS element comprises a Traffic Identifier (TID) field and a direction field, wherein the presence signaling information is after the TID field and the direction field.

Example 45 includes the subject matter of any one of Examples 26-44, and optionally, wherein the plurality of parameter fields comprise stream-specific parameter fields.

Example 46 includes the subject matter of any one of Examples 26-45, and optionally, wherein the frame comprises a Stream Classification Service (SCS) request frame of an SCS procedure.

Example 47 includes the subject matter of Example 46, and optionally, wherein the EHT STA comprises an EHT STA of a first Multi-Link Device (MLD), wherein the SCS procedure comprises an SCS procedure between the first MLD and a second MLD.

Example 48 includes the subject matter of any one of Examples 26-47, and optionally, wherein the EHT STA comprises an EHT Access Point (AP), wherein the frame comprises a frame from a non-AP EHT STA.

Example 49 includes the subject matter of any one of Examples 26-48, and optionally, comprising at least one radio to receive the frame.

Example 50 includes the subject matter of Example 49, and optionally, comprising one or more antennas connected to the radio, and a processor to execute instructions of an operating system of the EHT STA.

Example 51 comprises a wireless communication device comprising the apparatus of any of Examples 1-50.

Example 52 comprises an apparatus comprising means for executing any of the described operations of any of Examples 1-50.

Example 53 comprises a product comprising one or more tangible computer-readable non-transitory storage media comprising computer-executable instructions operable to, when executed by at least one processor, enable the at least one processor to cause a wireless communication device to perform any of the described operations of any of Examples 1-50.

Example 54 comprises an apparatus comprising: a memory interface; and processing circuitry configured to: perform any of the described operations of any of Examples 1-50.

Example 55 comprises a method comprising any of the described operations of any of Examples 1-50.

Functions, operations, components and/or features described herein with reference to one or more aspects, may be combined with, or may be utilized in combination with, one or more other functions, operations, components and/or features described herein with reference to one or more other aspects, or vice versa.

While certain features have been illustrated and described herein, many modifications, substitutions, changes, and equivalents may occur to those skilled in the art. It is, therefore, to be understood that the appended claims are intended to cover all such modifications and changes as fall within the true spirit of the disclosure.

What is claimed is:

1. An apparatus comprising:
a processor configured to cause an Extremely High Throughput (EHT) wireless communication station (STA) to:
set a control field comprising presence signaling information corresponding to a plurality of parameter fields, the presence signaling information configured to indicate, for a parameter field of the plurality of parameter fields, whether the parameter field is to be present or absent in a Quality of Service (QOS) element, wherein the control field comprises a presence bitmap comprising a plurality of bits corresponding to the plurality of parameter fields, wherein a first bit in the presence bitmap corresponds to a first parameter field of the plurality of parameter fields, a value of the first bit in the presence bitmap is to indicate whether the first parameter field is to be present or absent in the QoS element, wherein a second bit in the presence bitmap corresponds to a second parameter field of the plurality of parameter fields, a value of the second bit in the presence bitmap is to indicate whether the second parameter field is to be present or absent in the QoS element; and
transmit a frame comprising the QoS element, the QoS element comprising the control field, wherein the presence or absence of the plurality of parameter fields in the QoS element is configured according to the presence signaling information in the control field; and
a memory to store information processed by the processor.

2. The apparatus of claim 1 configured to cause the EHT STA to set to 1 a bit in the presence bitmap corresponding to a parameter field to be present in the QoS element, and to configure the QoS element to include the parameter field to be present in the QoS element.

3. The apparatus of claim 1, wherein a bit in the presence bitmap corresponding to a parameter field which is absent from the QoS element is 0.

4. The apparatus of claim 1, wherein the plurality of parameter fields comprises at least one of a size field, or a time field.

5. The apparatus of claim 1, wherein the first parameter field comprises a maximum Medium Access Control (MAC) Service Data Unit (MSDU) size field.

6. The apparatus of claim 1, wherein the QoS element comprises a plurality of predefined parameter fields, wherein the presence signaling information corresponds to a plurality of additional parameter fields different from the plurality of predefined parameter fields.

7. The apparatus of claim 6, wherein the QoS element is configured according to a QoS element format, the QoS element format comprising the plurality of predefined parameter fields after the control field, and the plurality of additional parameter fields after the plurality of predefined parameter fields.

8. The apparatus of claim 6, wherein the plurality of predefined parameter fields comprises at least one of a minimum service interval field, a maximum service interval field, a minimum data rate field, or a delay bound field.

9. The apparatus of claim 1, wherein the plurality of parameter fields comprises a mean data rate field.

10. The apparatus of claim 1, wherein the plurality of parameter fields comprises a delivery ratio field predefined.

11. The apparatus of claim 1, wherein the plurality of parameter fields comprises a medium time field.

12. The apparatus of claim 1, wherein the QoS element comprises a Traffic Identifier (TID) field and a direction field, wherein the presence signaling information is after the TID field and the direction field.

13. The apparatus of claim 1, wherein the plurality of parameter fields comprise stream-specific parameter fields.

14. The apparatus of claim 1, wherein the frame comprises a Stream Classification Service (SCS) request frame of an SCS procedure.

15. The apparatus of claim 14, wherein the EHT STA comprises an EHT STA of a first Multi-Link Device (MLD), wherein the SCS procedure comprises an SCS procedure between the first MLD and a second MLD.

16. The apparatus of claim 1 comprising a radio, the processor to cause the radio to transmit the frame.

17. The apparatus of claim 16 comprising one or more antennas connected to the radio, and another processor to execute instructions of an operating system of the EHT STA.

18. A product comprising one or more tangible computer-readable non-transitory storage media comprising instructions operable to, when executed by at least one processor, enable the at least one processor to cause an Extremely High Throughput (EHT) wireless communication station (STA) to:
set a control field comprising presence signaling information corresponding to a plurality of parameter fields, the presence signaling information configured to indicate, for a parameter field of the plurality of parameter fields, whether the parameter field is to be present or absent in a Quality of Service (QOS) element, wherein the control field comprises a presence bitmap comprising a plurality of bits corresponding to the plurality of parameter fields, wherein a first bit in the presence bitmap corresponds to a first parameter field of the plurality of parameter fields, a value of the first bit in the presence bitmap is to indicate whether the first parameter field is to be present or absent in the QoS element, wherein a second bit in the presence bitmap corresponds to a second parameter field of the plurality of parameter fields, a value of the second bit in the presence bitmap is to indicate whether the second parameter field is to be present or absent in the QoS element; and
transmit a frame comprising the QoS element, the QoS element comprising the control field, wherein the presence or absence of the plurality of parameter fields in the QoS element is configured according to the presence signaling information in the control field.

19. The product of claim 18, wherein the instructions, when executed, cause the EHT STA to set to 1 a bit in the presence bitmap corresponding to a parameter field to be present in the QoS element, and to configure the QoS element to include the parameter field to be present in the QoS element.

20. An apparatus for an Extremely High Throughput (EHT) wireless communication station (STA), the apparatus comprising:
means for setting a control field comprising presence signaling information corresponding to a plurality of parameter fields, the presence signaling information configured to indicate, for a parameter field of the plurality of parameter fields, whether the parameter field is to be present or absent in a Quality of Service (QOS) element, wherein the control field comprises a presence bitmap comprising a plurality of bits corresponding to the plurality of parameter fields, wherein a first bit in the presence bitmap corresponds to a first parameter field of the plurality of parameter fields, a value of the first bit in the presence bitmap is to indicate whether the first parameter field is to be present or absent in the QoS element, wherein a second bit in the presence bitmap corresponds to a second parameter field of the plurality of parameter fields, a value of the second bit in the presence bitmap is to indicate whether the second parameter field is to be present or absent in the QoS element; and means for causing the EHT STA to transmit a frame comprising the QoS element, the QoS element comprising the control field, wherein the presence or absence of the plurality of parameter fields in the QoS element is configured according to the presence signaling information in the control field.

21. The apparatus of claim 20, wherein the QoS element comprises a plurality of predefined parameter fields, wherein the presence signaling information corresponds to a plurality of additional parameter fields different from the plurality of predefined parameter fields.

\* \* \* \* \*